(12) United States Patent
Bergeron et al.

(10) Patent No.: US 6,246,410 B1
(45) Date of Patent: *Jun. 12, 2001

(54) METHOD AND SYSTEM FOR DATABASE ACCESS

(75) Inventors: Louise M. Bergeron, Greenland; Mark P. Klein, Newmarket, both of NH (US); Paul H. Orsillo, Kittery Pt., ME (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/588,770

(22) Filed: Jan. 19, 1996

(51) Int. Cl.[7] ................................................. G06F 15/00
(52) U.S. Cl. ............................ 345/357; 345/335; 345/347
(58) Field of Search .................................. 395/340, 339, 395/347, 326, 348, 350, 346, 357, 356, 335, 329, 330, 341, 352, 342, 343, 344, 345, 331; 707/201; 364/283.4

(56) References Cited

U.S. PATENT DOCUMENTS

| | | | | |
|---|---|---|---|---|
| 5,297,249 | * | 3/1994 | Bernstein et al. | 395/335 |
| 5,394,521 | * | 2/1995 | Henderson, Jr. et al. | 395/329 |
| 5,412,774 | * | 5/1995 | Agrawal et al. | 395/157 |
| 5,432,903 | * | 7/1995 | Frid-Nielsen | 395/335 |
| 5,481,666 | | 1/1996 | Nguyen et al. | 395/357 |
| 5,499,359 | * | 3/1996 | Vijaykumar | 707/201 |
| 5,568,639 | * | 10/1996 | Wilcox et al. | 395/600 |
| 5,625,781 | * | 4/1997 | Cline et al. | 395/335 |
| 5,638,523 | * | 6/1997 | Mullet et al. | 395/326 |
| 5,651,108 | * | 7/1997 | Cain et al. | 345/340 |
| 5,664,208 | * | 9/1997 | Pavley et al. | 707/515 |
| 5,668,964 | * | 9/1997 | Helsel et al. | 345/350 |
| 5,689,703 | * | 11/1997 | Atkinson et al. | 707/103 |
| 5,694,546 | * | 12/1997 | Reisman | 705/26 |
| 5,694,608 | * | 12/1997 | Shostak | 707/506 |
| 5,701,400 | * | 12/1997 | Amada | 706/45 |
| 5,710,900 | * | 1/1998 | Anand et al. | 345/339 |

\* cited by examiner

*Primary Examiner*—Steven Sax
(74) *Attorney, Agent, or Firm*—Hunton & Williams

(57) ABSTRACT

The present invention comprises a method and system for accessing the contents of a database from an OLE enabled user application without requiring the database to be open on the users desktop or requiring the user to know a text based data manipulation language. That is, using OLE's drag and drop methodology, a user may search the contents of a database to generate a result set of rows from the database and utilize information content from the resulting rows as desired. An OLE enabled user application is opened on a user's computer. The user then selects the location of a database to be accessed using a dialogue. Once the desired database is located, a "palette" is created at a portion of the screen of the user's computer. Once the palette is created, the user then searches and accesses the contents of the database by using drag and drop gestures in conjunction with the OLE enabled user application and the established palette.

43 Claims, 21 Drawing Sheets

FIG. 2A

| NAME | CITY |
|---|---|
| COOK, S. | SEATLLE, WA |
| JONES, R. | BISMARCK, ND |
| MARTIN, B. | ARLINGTON, VA |
| SMITH, J. | NEW YORK, NY |
| ⋮ | ⋮ |

FIG. 14

METHOD AND SYSTEM FOR DATABASE ACCESS

FIELD OF THE INVENTION

This invention relates to facilitating access to information content of user applications. More specifically, this invention relates to a method and system for copying or moving information content between a database and a user application without opening the database at the time of the move or copy.

BACKGROUND OF THE INVENTION

Computer systems in general are well known. A typical system comprises a computer, keyboard, mouse, and a monitor. Further, the computer might comprise a CPU, and RAM and allow various software programs to used. Software programs which might be used include, among others, databases, word processors, and spreadsheets. These software programs can be referred to as user applications. When a user of a computer system is using a user application so that it can be displayed on the monitor, that application is said to be open on the user's desktop.

Databases are also well known and will not be described in detail. Briefly, a database is a group of related information. Typically the related information is organized into records or rows. In some environments, such as Lotus Notes®, the term document is used. For simplicity, the term row is used hereinafter. Each row may include one or many fields, each field containing information content in a particular data format. That is, the term information content, as used herein, refers to raw information which is not in any format. Whereas the term data refer to information in a particular format, such as, ASCII text. Information content is entered into the fields of a database using a form. A form defines parameters for each field in a particular row in the database, for instance, whether the field accepts numbers letters or both. A database may contain rows originating from a number of different forms. A database has a natural representation for its data which may be different for different databases. In a relational database, for instance, the natural representation for the data is a table with each row of the table representing a different row of the database and each column a different field of the row. In other databases, for instance, those databases compatible with Lotus Notes®, the contents may be examined in a number of different "views." A view sorts the rows within a database based on the information content of a particular field within the form with which the row was created. Further, a view may present fields from more than one form and need not present all fields within a form. FIG. 14 is one example of how a view may be used to show a subset of the fields within a database. FIG. 14 shows a view of a database including a name field and a city field from each row. The data shown in FIG. 14, however, may have been entered using a form which also included a field for telephone number and post office address or any other information.

It is often desired to access information content within multiple user applications. The term access, as used herein, refers to operations such as moving and copying information content between user applications. For instance, it may be desired to move or copy the information content of a first field of a row of a database, to a second field of a row within a receiving database or to move or copy certain information content from a word processor to a field of a row of a receiving database. Typically, moving and copying operations (hereinafter referred to as move/copy operations) require either opening the database which is to receive the information content and manually entering the desired information into the desired field, or opening both databases (in the first case) or both the word processor and the database (in the second case) and performing a move/copy operation in a known manner. Both of these approaches have drawbacks. Manual entry, among other things, is time consuming, and susceptible to human error. Performing a move/copy uses a large amount of memory because two applications must be open, and requires the user to enter into and navigate within the application from which the information is to be obtained. For large databases this can be quite time consuming. Moreover, in some cases, move/copy operations between nonadjacent fields or rows can require multiple move/copy operations.

SUMMARY OF THE INVENTION

It is one object of the present invention to resolve these and other drawbacks.

It is another object of the present invention to provide a method and system for facilitating accessing the contents of a database or other user application.

The preferred embodiments of the present invention enable the information content of a database or other user application to be accessed without that user application being open. Access to an unopened user application, for instance a database, is enabled by a graphical user interface (GUI) with specialized functionality. The GUI may be, for instance, a data palette comprising data controls and a tool bar. The data palette takes up only a small portion of a display screen of a computer and thus does not obscure any user applications which may be open on the computer. The data controls are represented by icons and correspond to user selectable fields within a database of interest. The data controls accept drag and drop data objects and pass the information content from those data objects or the data objects themselves, for example, OLE (Object Linking and Embedding) embedded objects to the database. By using the drag and drop gestures in conjunction with a data control, a field of the database of interest corresponding to the data control may be searched (for example, to make a determination of whether the field contains the information content of the data object) and/or accessed (for example, the information content of the data object may be moved or copied to the database) depending on a subsequent selection from the tool bar. That is, the tool bar, among other things, controls the functionality of the data controls. For instance, when a data object is dropped on a data control, the information content of the data object will be added to the database if the user selects the add button from the tool bar after performing the drop. If, however, the search button is selected after a data object is dropped on a data control, then the database is searched for the corresponding information content. The data controls are also used to view the information content of the database of interest through the use of, for example, a pop up window or data grid. Further, methods and systems for database access according to preferred embodiments of the present invention are bidirectional. That is, the data controls also generate data objects and provide a user application with the information content from the data objects or the data objects themselves thus allowing information content from a database to be used within a user application.

In one embodiment, the present invention comprises a system for accessing information content of a row in an unopened database. The system preferably comprises an OLE enabled user application running on a general purpose computer and a GUI displayed on a display of the computer. The GUI enables information content of the unopened database to be searched and accessed from the OLE enabled user application. The GUI further enables the information content of the unopened database to be displayed on the computer display and permits a user to control how the information content is displayed. The computer may be a stand alone computer or may operate within a network comprising a plurality of fileservers, each of the fileservers comprising a plurality of databases. The unopened database may reside in local RAM of the computer or on one of the plurality of fileservers of the network.

In another embodiment, the present invention comprises a method of accessing the information content of an unopened database. The method comprises an initial step of selecting a database which it is desired to access. Once a desired database is selected, a GUI is created on a display. Using drag and drop gestures in conjunction with the GUI, information content of the desired database is searched, viewed and accessed without opening the database on a user's desktop.

In another embodiment, the present invention comprises a method for accessing the contents of a database without opening the database on a user's desktop. The method comprises establishing a GUI upon a portion of the desktop of a user's computer, said GUI comprising a set of visual cues representing user-selectable fields within the database. The GUI is used for searching the information content of the database through the visual cues and accessing the contents of the database through the visual cues.

In another embodiment, the present invention comprises a computer system configured to access information content within a database without opening the database being accessed on a user's desktop. The computer system may comprise a stand alone computer or a computer operating within a network.

Other features and aspects of the present invention will be apparent from the drawings and detailed description of the invention.

BRIEF DESCRIPTION OF THE DRAWINGS

FIG. 2a shows an example of an active data grid of the data palette of FIG. 2.

FIG. 14 depicts an example of a name view of a database according to one embodiment of the present invention.

DETAILED DESCRIPTION OF THE PREFERRED EMBODIMENTS

The preferred embodiments of the invention provide a method and system for accessing the information content of a database, or other user application, without opening the database at the time of access. According to a preferred embodiment, this is accomplished by setting up a data palette comprising data controls which provide access to the information content of the database (or other user application), and then accessing the information content of the database through the data palette (rather than by opening the database) when it is desired to use the information content of the database in a second user application. For example, if the database (or other user application) is OLE2 (hereinafter OLE) enabled, then the data palette may be used in conjunction with well known OLE drag and drop methodology to search the information content of the database thereby creating a result set of rows. The information content from any row within the result set may then be accessed as a user desires (for instance by moving or copying the information content from the unopened database into a second user application) without opening the database on the desktop. Furthermore, the present invention allows a user to move/copy information content from a first user application to a second user application without opening the second user application.

The present invention has utility in a number of different operating environments and is usable with various user applications. For purposes of simplifying the detailed description of the invention, the preferred embodiments of the present invention are explained with reference to a Windows® environment operating with OLE enabled databases and other user applications as examples. The invention in not, however, limited to operation in a Windows® environment or to use with any particular user application. Rather, the invention is suitable for accessing databases in any environment.

Figure 1:
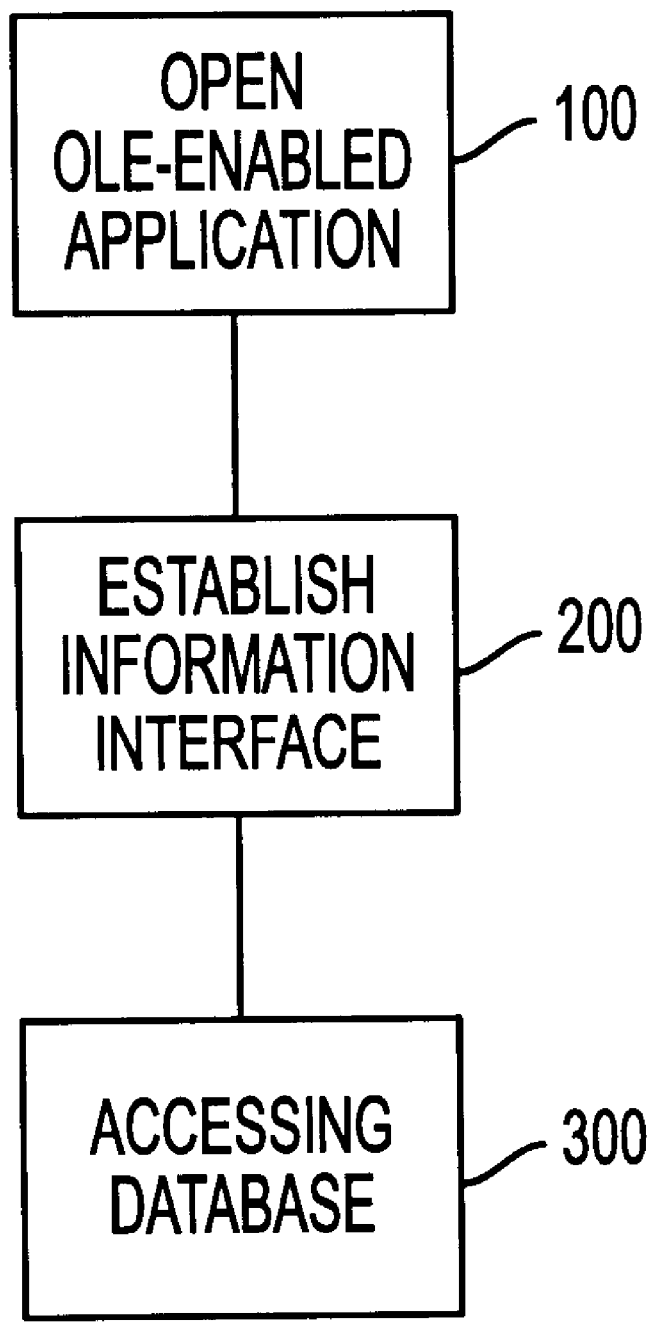
FIG. 1 is a flow chart illustrating the steps of a method according to one embodiment of the present invention.

FIG. 1 shows procedures according to a preferred embodiment of the present invention for accessing a database from any OLE enabled application. In step 100, a user opens an OLE enabled user application (hereinafter application) on the user's computer. The user then establishes a information interface (step 200) at a portion of the desktop of the user's computer. The information interface is a GUI that represents a link between a selected database and the application and allows information content of the selected database to be accessed from the application. Preferably, the information interface is a data palette as discussed in more detail below. Once the information interface is established, a user accesses the contents of the selected database through the information interface (step 300). For instance, a user may search information content of the selected database using the information interface to create a result se of rows. A result set of rows comprises all rows within the selected database having certain information content (for instance, a name appearing in a certain field of the row). A user may then move/copy the information content from any field of any row within the result set to the application using the information interface in conjunction with OLE drag and drop gestures. Conversely, the user may move/copy information content to any field of any row within the selected database from the application using the information interface in conjunction with OLE drag and drop gestures.

Figure 2:
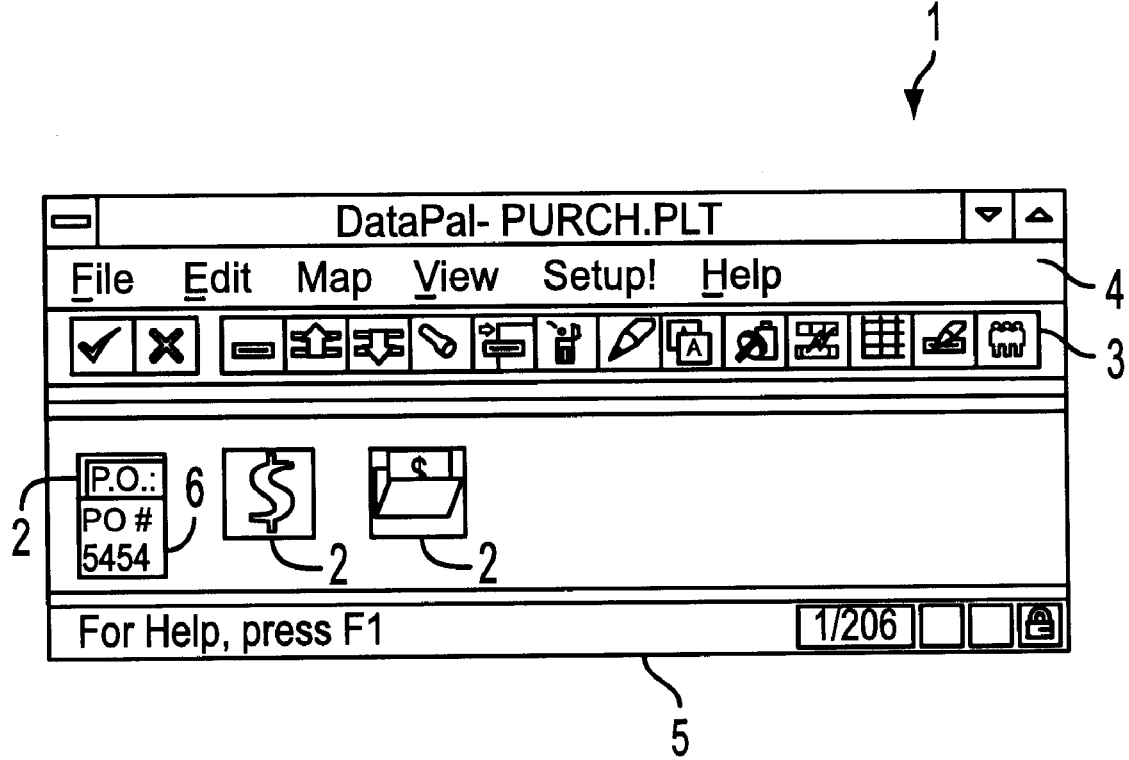
FIG. 2 shows an example of a data palette according to one embodiment of the present invention.

FIG. 2 shows an example of a data palette 1 according to a preferred embodiment of the present invention. Data palette 1 represents a view of the information content within the selected database. Data palette 1 comprises a set of visual cues called data controls 2. Data controls 2 represent user-selected fields from the selected database. That is, when palette 1 is created, a user selects the database fields of interest and assigns icons to represent those fields. Data palette 1 can be thought of as a graphical container which holds data controls 2. The process of establishing data palette 1 and its data controls 2 is explained in more detail below. In addition to data controls 2, data palette 1 comprises a tool bar 3, a menu bar 4 and a status bar 5.

Figure 3:
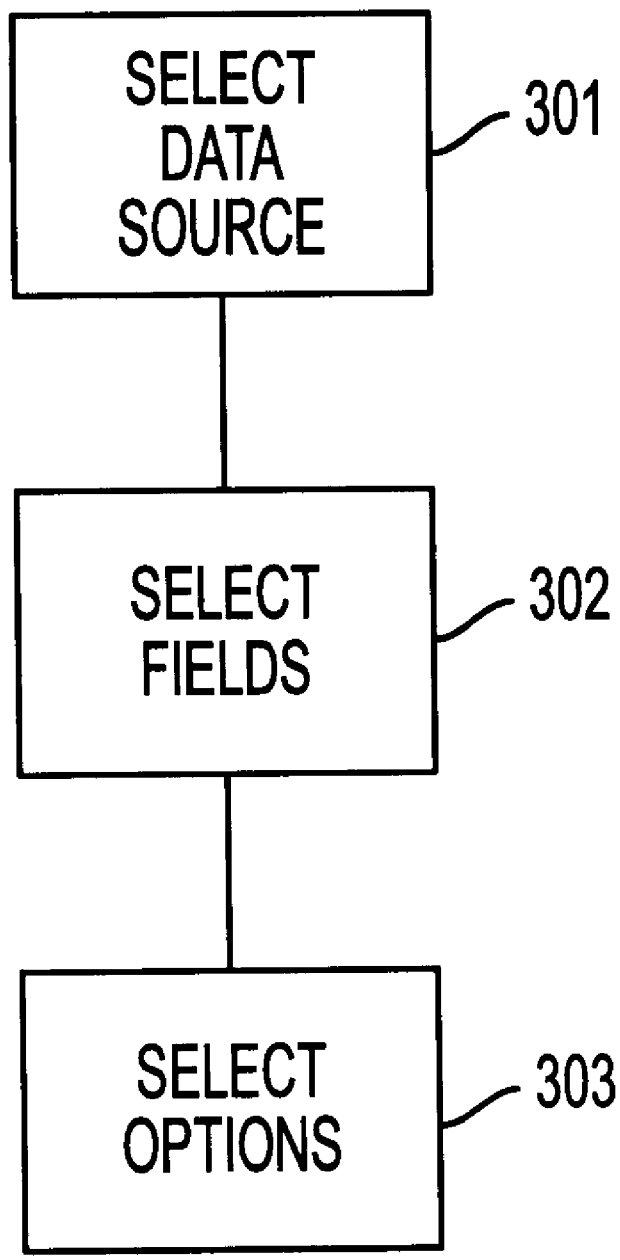
FIG. 3 is a flow chart illustrating the steps for establishing a palette according to one embodiment of the present invention.
Figure 4:
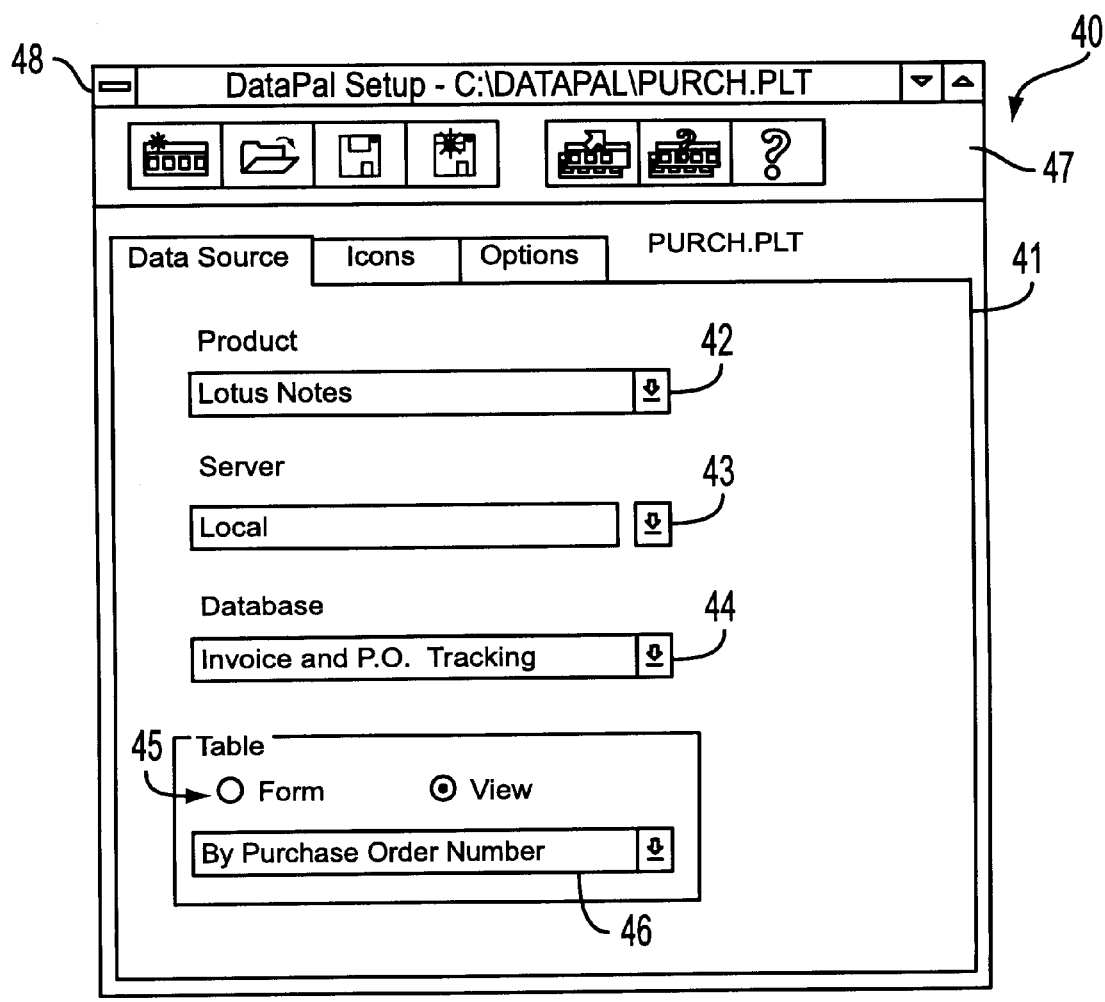
FIG. 4 shows an example of a setup dialogue with a Data Source menu visible according to one embodiment of the present invention.

FIG. 3 is a flow chart illustrating steps of creating data palette 1. According to one preferred embodiment, data palette 1 is set up using a set up dialogue. FIG. 4 shows a setup dialogue 40 according to one embodiment of the present invention. Setup dialogue 40 is a tabbed dialogue comprising three tabs: Data Source, Icons and Options. Each of the tabs has a menu associated with it which becomes active when the tab is actuated, for example of clicking on it with a mouse. The menus associated with the three tabs are operable to accomplish the three steps of the flow chart of FIG. 3. Further tabs could be used as desired. In an initial step 301, a data source is selected. This is accomplished by selecting the Data Source tab of setup dialogue 40 to display Data Source menu 41. Data Source menu options comprise Product combobox 42, Server combobox 43, Database combobox 44, Form/View radiobuttons 45 and Form/View combobox 46. Product combobox 42 allows the database product to be selected from a scrollable list of products. The term product refers to, for example, different systems in which databases may be established, for example, Lotus Notes® or a relational database product. Product combobox 42 in FIG. 4 shows the product as Lotus Notes®. Server combobox 43 displays the available active servers in a scrollable list. The contents of Server combobox 43 are refreshed whenever its scroll tongue receives focus. Database combobox 44 displays a scrollable list of available databases for the server selected via Server combobox 43 and the product selected via Product combobox 42. The contents of Database combobox 44 are refreshed when Server combobox 43 is refreshed. Form/View combobox 46 displays a scrollable list of the forms or views (depending on the states of the Form/View radiobuttons 45) available for the database selected via Database combobox 44. Form/View radiobuttons 45 determine how information within the database selected via Database combobox 44 will be displayed, as a form or a view. If the product selected via Product combobox 42 is a database whose natural data representation does not involve forms and views, then Form/View radiobuttons 45 and Form/View combobox 46 will be hidden. Form/View radiobuttons 45 may both be in the "Off" state. The "On" states of Form/View radiobuttons 45 are, however, mutually exclusive. The contents of Form/View combobox 46 are refreshed whenever the states of Form/View radiobuttons 45 change and whenever Database combobox 44 is refreshed.

Figure 5:
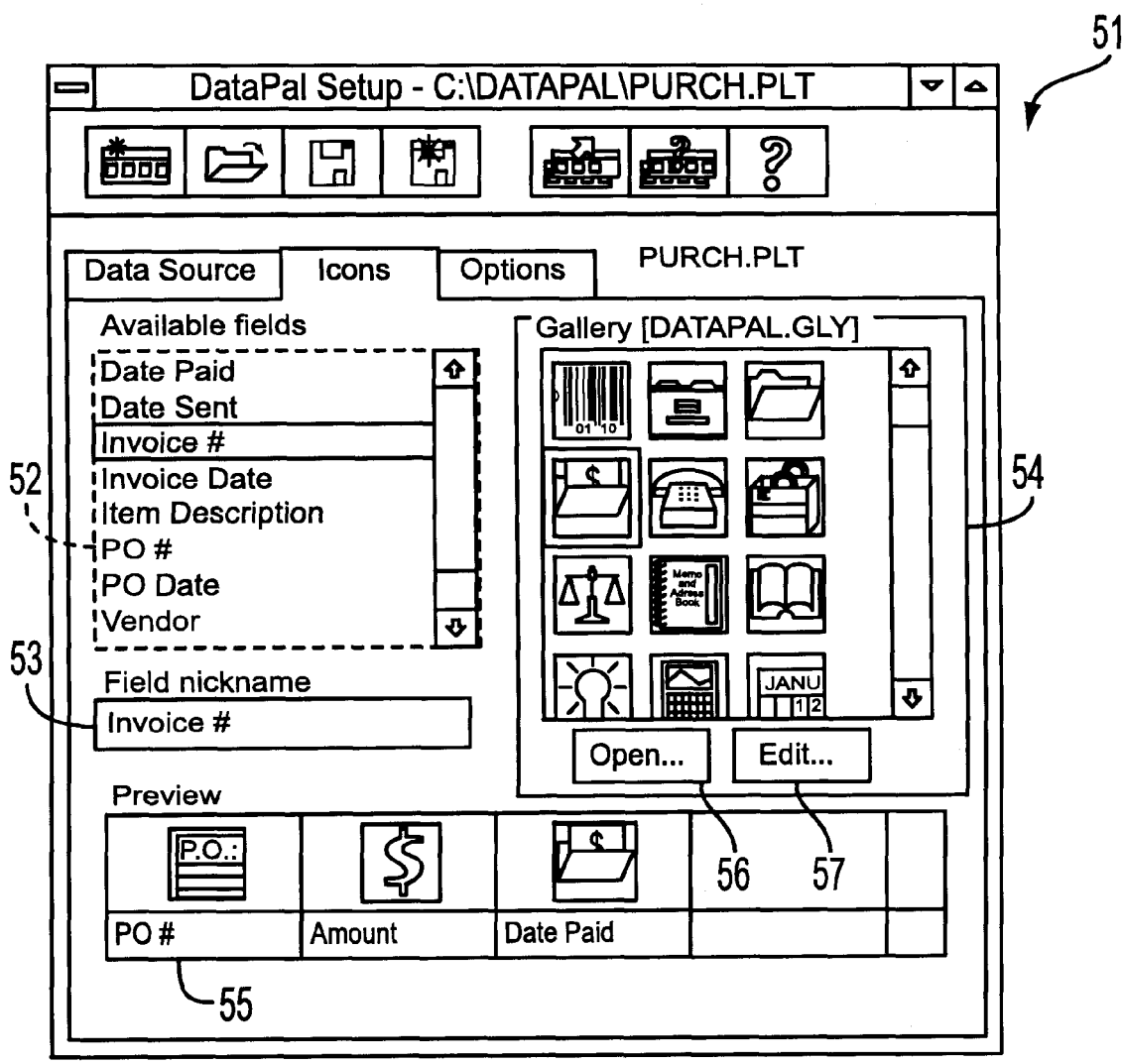
FIG. 5 shows an example of a setup dialogue with an Icons menu visible according to one embodiment of the present invention.

One situation for which the invention is useful is where a given database contains a large number of fields within each row and/or a large number of rows, and a user is interested in only a subset of those fields/rows. Therefore, after a data source has been selected, desired data fields are selected from that data source (step 302). According to a preferred embodiment, field selection (step 302) is performed by selection of the Icon tab from Setup dialogue 40. Referring to FIG. 5, actuation of the Icon tab of Setup dialogue 40 causes Icon menu 51 to be an active menu. In a preferred embodiment, Icon menu 51 comprises Available Fields list 52, Field Nickname box 53, Icon Gallery 54, Palette Preview section 55, Open button 56 and Edit button 57. Available Fields list 52 contains a list of all the fields within the selected database. Field nickname box 53 allows user entry of a modified name for a field, for instance to use a shorter or more recognizable name. Icon Gallery 54 displays an "open-ended" group of icons. Icon Gallery 54 is open-ended in that icons can be added to or subtracted from Icon Gallery 54 using Edit button 57 and new gallery files can be loaded using Open button 56. To implement step 302, a user selects desired fields from Available Fields list 52 and drags them onto Palette Preview Section 55. Similarly, a user drags icons from Icon Gallery 54 onto Palette Preview section 55 thus associating each field selected with an icon. Alternatively, step 302 may be implemented by selecting (for instance by clicking with the mouse) a field name from Available Fields list 52 or an icon from Icon gallery 54. The field or icon selected will show up in Palette Preview section 55. Selection step 302 may also be accomplished by dragging and dropping, field name from Available Fields list 52 on to an icon from Icon gallery 54 or vice versa. In this case both the field and the icon will show up in Palette Preview section 55. When the association of fields with icons is complete, the icons representing the data controls are displayed within the palette as device independent bitmap (DIB) representations.

In step 303, a user selects options controlling palette appearance and behavior. According to a preferred embodiment, palette option selection (step 303) is performed by actuating the Options tab from Setup dialogue 40.

Figure 6:
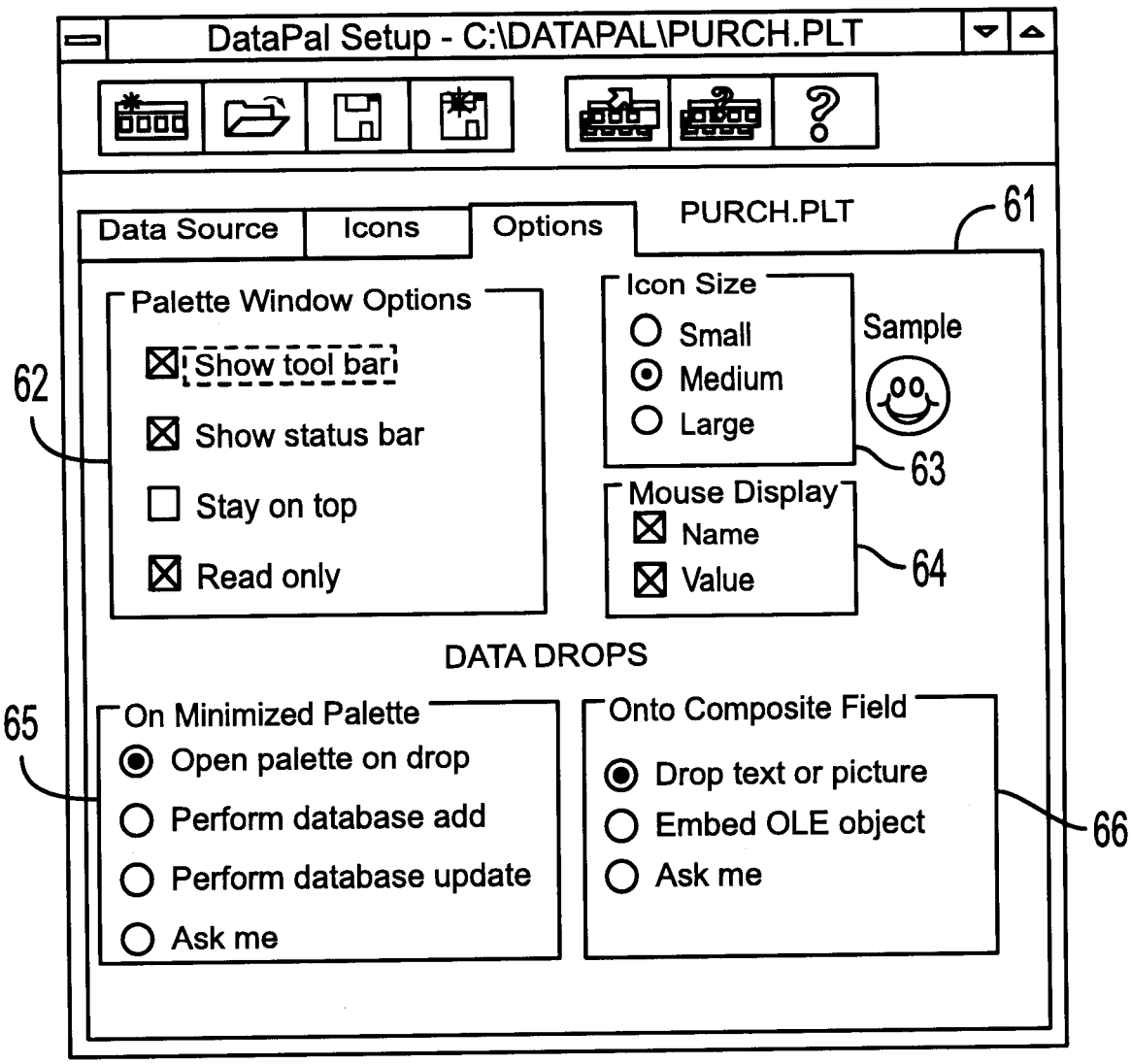
FIG. 6 shows an example of a setup dialogue with an Options menu visible according to one embodiment of the present invention.

As shown in FIG. 6, actuating the Options tab causes Options menu 61 to be an active menu. In the embodiment shown in FIG. 6, Options menu 61 comprises five groups of controls: Palette Window Options box 62, Icon Size box 63, Mouse Display box 64, Data Drops On Minimized Palette box 65 and Data Drop Onto Composite Field box 66. Palette Window Options box 62 comprises check boxes to select whether tool bar 3 and status bar 4 are shown. Stay on Top check box causes the palette to always remain the topmost window on the desktop. This option might be useful, for instance, if the palette is being used in conjunction with a word processor that typically takes up a lot of real estate on the desktop but frequent access to the palette is necessary. Read Only check box allows a user to designate a data palette and its associated database as available for viewing (i.e., browsing) only. If a palette is designated read only, drags and drops from and to the palette may occur, but no updates or additions can be made to the underlying database. This option may be useful, for instance, if the information within the database has controlled access, or if a palette is to be widely distributed as a reference file (for instance to a corporate telephone directory). Further, this option is dictated by certain database products. For example, in Lotus Notes® databases, information content presented in a view is read only by definition. Icon Size box 63 allows adjustment of the icon size. In the example shown, three size options are presented, however, greater or fewer option may be provided if desired. Mouse Display box 64 comprises check boxes to select whether the value of a field, the name of a field or both will be displayed when a particular icon in a data palette receives mouse focus. An icon receives mouse focus when a cursor is positioned over the icon.

Data Drop On Minimized Palette box 65 comprises radiobuttons which select system behavior when a data object is dropped onto a minimized icon for a palette. That is, a user may minimize data palette 1 on the desktop. When data palette 1 is minimized, however, it retains at least some of its functionality. The radiobuttons in section 65 select what functionality is retained when a palette is minimized. If the Open Palette radiobutton is selected, data palette 1 will be opened when a data object is dropped on a minimized palette. If the Perform Database Add radiobutton is selected, a drop will cause a new row to be established in the database. The information content of the data object dropped will be added to the database in the new row in the field or fields corresponding to the data controls 2 selected using a map (the mapping function is explained in more detail below) before data palette 1 was minimized. If no map was selected, a default map will be generated and the palette will be opened. The user will be prompted to confirm or modify the default map generated by the system. If the Perform Database Update radiobutton is selected, a drop will cause information content within the active row of the result set to be replaced with the information content of the data object. As with the Perform Database Add radiobutton, the data object is sorted into a specific field of the active row according to a selected map. If the Ask Me radiobutton is selected, a user will be prompted as to which of the above options is desired at the time the drop occurs.

Data Drop Onto Composite Field box 66 comprises radiobuttons that select system behavior when a data object is dropped onto a drop target which supports OLE capable fields. That is, a user application which supports OLE embedded objects or one of data controls 2 corresponding to a field of a database which supports OLE embedded objects. As explained below, when a data object is dropped onto an OLE capable field, the data object can be in one of two or more forms. For example, the data object may be in a static data format such as text or picture, or it may be an OLE embedded object. In the embodiment shown in FIG. 6, the radiobuttons in Data Drop Onto Composite Field box 66 select whether a dropped data object will be taken as static data, such as text or picture, or as an OLE embedded object. If the Ask Me radiobutton is selected, a user will be prompted as to how the object should be taken at the time of a drop. If the drop target does not support OLE embedded objects, the dropped object is taken as text or picture. Other static data formats could be used.

Referring back to FIG. 4, Setup dialogue 40 includes a tool bar 47. Tool bar 47 of setup dialogue 40 implements a number of commands. One function implementable from tool bar 47 is Save. At any time during the setup procedure, a document representation of the palette may be saved for later recall by activation of the Save icon on tool bar 47. Another function implementable from tool bar 47 is Open. The Open function allows a saved palette to be opened. When a saved palette is opened from Setup dialogue 40, the palette may be modified through the functionality of Setup dialogue 40. Setup dialogue 40 may be closed from its control box 48.

Figure 7:
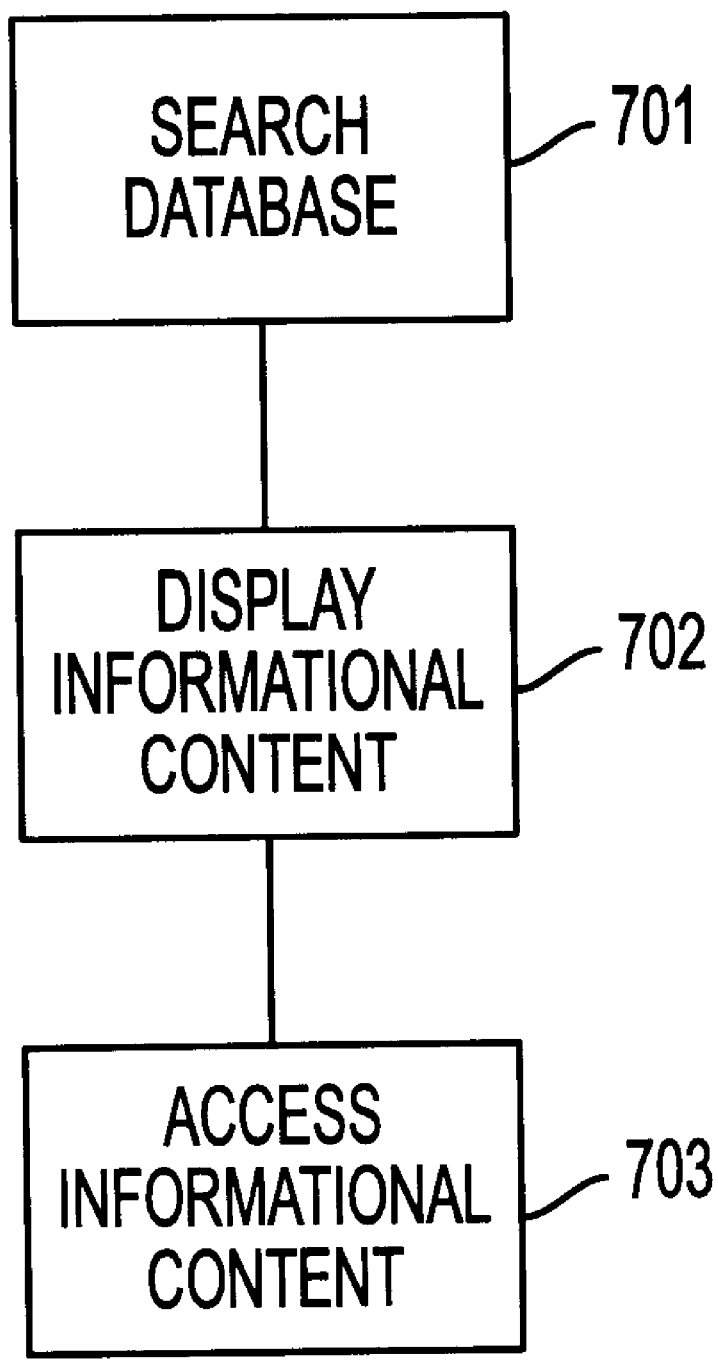
FIG. 7 is a flow chart illustrating the steps for accessing a database according to one embodiment of the present invention.

With reference to FIG. 7, step 300 (FIG. 1) of accessing a database is comprised of three substeps, searching, displaying and accessing the contents of a selected database. In step 701, the selected database is searched, for instance to find all rows within the selected database which contain certain information content in a certain field. Preferably this is done using data palette 1 through the use of OLE drag and drop gestures in conjunction with data controls 2. The first step in accomplishing a search is to select the Search function. In one embodiment, this is done by actuating a Search button from tool bar 3 (hereinafter Tool Bar Search button) of data palette 1 which opens a Search dialogue. The Search dialogue comprises a Data Control list box which lists all of the data controls for the palette, a Value text box which displays the value of the field corresponding to the data control selected in the Data Control list box and a Search button (hereinafter, the Search Dialogue Search button). With the Search dialogue open, a search may be accomplished in a number of ways. For example, a search may be accomplished by highlighting a word in an application open on the desktop to create a data object, for instance using OLE methodology, and dragging and dropping the data object onto a selected one of the data controls. Upon receiving a drop, the field corresponding to the selected data control within each row of the database may be searched for the presence of the highlighted word by actuating the Search Dialogue Search button. Alternatively, a Search may also be accomplished by manually entering the search parameters into the Value text box (for example, inputting a word through the keyboard). In this case the field of the database corresponding to the data control selected in the Data Control list box will be searched for the presence of the word search parameters input to the Value text box. In another embodiment, a search may be performed by dropping a data object on a data control and then actuating the Tool Bar Search Button. In this embodiment, the search dialogue will open with the name of the data control which received the drop highlighted in the Data Control list box and the information content of the data object dropped displayed in the value text box. The search may then be carried out by actuating the Search Dialogue Search button. A search typically yields each row within the database which contains the search parameters in the field corresponding to the selected data control.

The collection of corresponding rows comprises a result set. In one embodiment, one row of a result set is an active row. The active row of a result set is the row whose data is immediately accessible by a user through the data palette. The first row of the result set will initially be the active row. Palette tool bar 3, however, contains Next and Previous buttons (represented by arrow icons) which are used to scroll through a result set and change the active row.

Figure 2A:
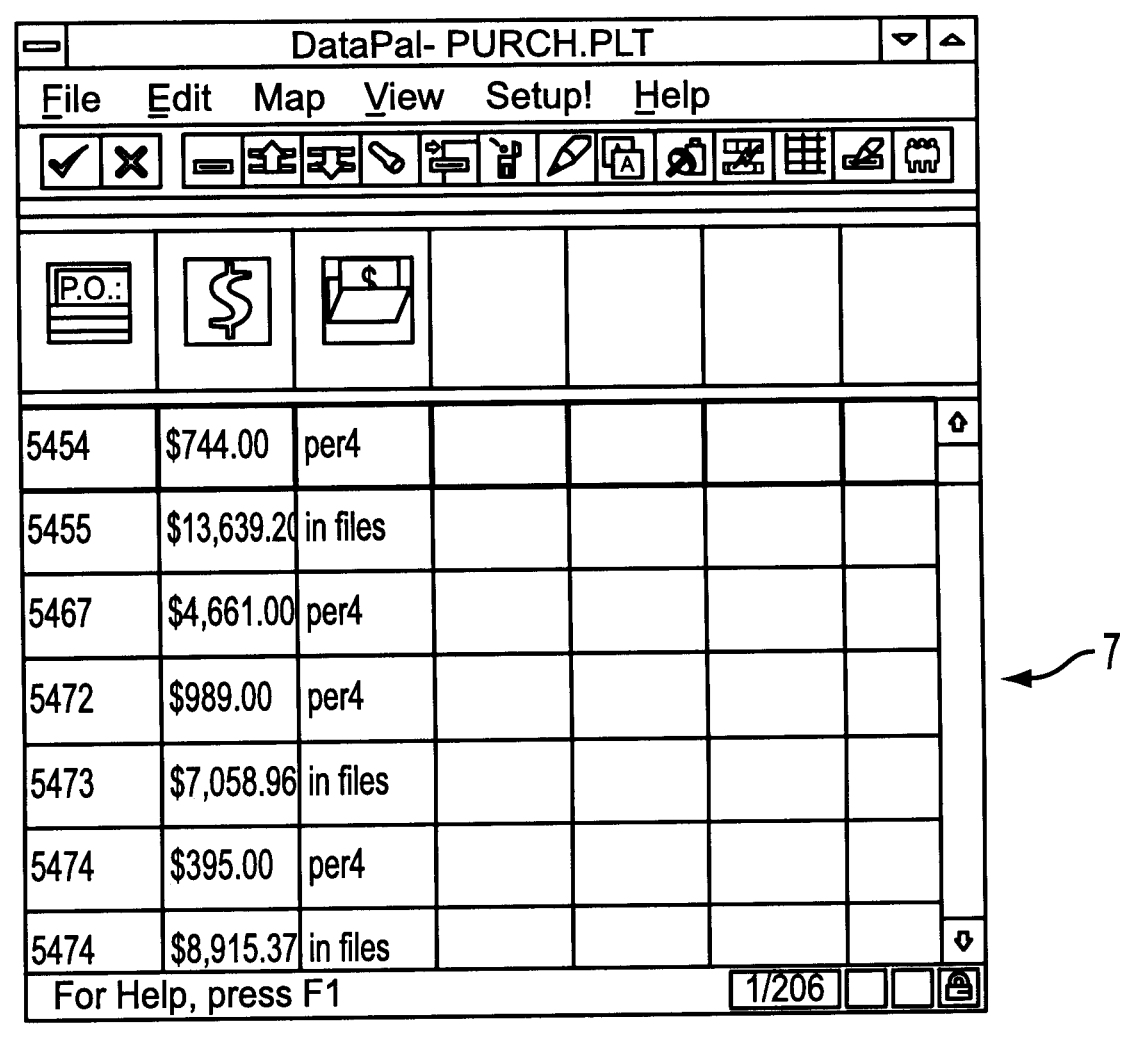

In step 702, data palette 1 is used to display information content of the rows of a result set. According to one preferred embodiment, information content of the rows of the result set is displayed by positioning the mouse cursor over one of the data controls to display a pop-up window containing either or both of the data value and name of the field in the selected database corresponding to the data control over which the mouse cursor was positioned. For instance, FIG. 2 shows the situation where the mouse cursor is positioned over the P.O. data control and the window 6 is displayed including the name of the field, "PO #" and the value of the field, "5454." In another embodiment, the information content of the rows of a result set is displayed in a data grid. FIG. 2a, shows data palette 1 displaying data grid 7. As can be seen in FIG. 2a, data grid 7 allows the value of each field of a number of rows within a result set to be viewed simultaneously. The entries in data grid 7 are denoted grid column controls and, in the embodiment shown in FIG. 2a, comprise text representations of result set data. The entries in data grid 7 are not, however, limited to text representations. The entries in data grid 7 could also be, for example, bitmaps. Although not shown in FIG. 2a, data grid 7 may also display the name for each field in the first row of data grid 7. Data grid 7 is enabled by actuating a command from tool bar 3 and can be adjusted to display any number of rows.

In step 703, data palette 1 enables the information content of the selected database to be accessed from a user application. A database access comprises any of a number of operations. For instance, a database access may comprise a move/copy of information content from a database to a user application, a move/copy of information content from a user application to a database, and the deletion of information content from the database. Data palette 1 enables the move/copy of information from a database to a user application through data controls 2. Once a result set is derived, it may be desirable to us the information content from a particular field in a user application. In one embodiment, information content from the result set may be brought into and used within an application by highlighting the data control corresponding to the field of the database from which the information content is desired. This will create a data object which is then dragged into the application and dropped in the desired location in the application. Such an operation is typically a copy type of operation where the information content remains in the database in the data format which the database supports, but could be a move type of operation where the information content is removed from the database. In another embodiment, information content from an application is move/copied into a database by dragging and dropping a data object, created within an application using OLE functionality, onto a data control corresponding to the desired database field. When a drop onto a data control of a palette which has not been minimized occurs (as distinguished from drops on a minimized palette discussed in conjunction with FIG. 6), the data control stores the data object until a user determines what should be done with the information content, for instance, by actuating a button from palette tool bar 3. In one embodiment, a new row is established in the database, and the information content is added to the field in the new row corresponding to the data control on which the data object was dropped. This operation is called a database add and is selected by actuating an Add button from palette tool bar 3. In another embodiment, the information content in the field of the active row corresponding to the data control on which the data object was dropped is replaced by the information content of the data object. This operation is called a database update and is selected by actuating an Update button from palette tool bar 3. Database adds and updates may be either moves or copies depending on the application within which the data object was generated. In another embodiment, accessing the information content of the selected database comprises deleting a row from the selected database. This operation is accomplished by actuating a Delete Row button from palette tool bar 3. When Delete Row button is actuated, a row or rows of the selected database corresponding to the active row or rows of a result set is deleted and that row of the result set is deleted.

The move/copy of data from palette 1 to an application can be further enhanced through the use of data grid 8 shown in FIG. 2a. That is, while a palette has a data grid active, multiple rows of the data grid can be selected and moved or copied to a user application or deleted. For example, a database search may yield a number of rows within a result set which contain information which is needed for a spreadsheet. A user may select the rows of data grid 8 which correspond to the desired rows to create a data object. The desired rows can be selected either contiguously by holding down the shift key while selecting or dragging over the desired rows, or disjointly by holding down the control key on the keyboard while selecting. The use of, for instance, the shift and control keys to select multiple items as a single data object is known to those of ordinary skill in the art. The data object may then be dragged and dropped into the spreadsheet. The selected rows are then sorted into separate rows of the spreadsheet upon being dropped. The rows and elements within the rows are sorted, for instance, by recognizing tabbed elementation. Recognition of tabbed elementation essentially refers to the idea that tabs within a data table are used to identify separate rows and columns of the table. Recognition of tabbed elementation is a well known method of identify discreet portions of a block of data.

The following is a simple example of how the data palette may be used. Assume that a user is composing a letter in a wordprocessor and needs to know the city in which the addressee lives and that city information is contained in a database such as is shown in FIG. 14. Assume further that a data palette has been established for the database and that the data palette includes data controls corresponding to the name field and the city field of the database. To find the name of the city where the addressee lives, the user highlights the name of the addressee in the word processor thus creating an OLE data object, and drags and drops the data object onto the data control corresponding to the name field. The database access system extracts and stores the information content from the data object. The user then opens the search dialogue by actuating the Tool Bar Search button, and then actuates the Search Dialogue Search button at which point the database access system searches the database for rows containing the highlighted name in the name field and stores all rows containing that name as a result set. A user may then scroll through the result set (for instance, using the Next and Previous buttons on palette tool bar 3) and view the city corresponding to the name which was searched for at the data control corresponding to the city field of the database.

Once a user has located the desired name and city, the user may highlight the data control corresponding to the city field to create an OLE data object. The data object may then be dragged and dropped into the letter in the word processor and the information content of the data object used within the letter.

The move/copy of a data object to and from a database may be accomplished in a number of ways according to a user's discretion and the capabilities of the database and application. In one embodiment, as explained in conjunction with data drop onto composite field box 66 of FIG. 6, a data object can be moved or copied in a static data format, such as text, or as an OLE embedded object. For static data objects moved or copied from a database to an application, the system of the present invention extracts the information content from the database in a data format usable to the application (that is, the static data format) and passes it to the application through data palette 1. The static data format should be a format recognizable by the source database and the target application, essentially a "common denominator" data format. Data formatting in general, and the ability to export and import data between applications is well known and will not be explained in detail. For example, unformatted ASCII text is generally available to applications as a standard storage format and is used in one preferred embodiment to accomplish the move/copy of the information content of a data object. For the move/copy of data objects to a database such as the database add and update functions discussed above, OLE is relied on to create the data object within the application. Data objects created by OLE are generally text objects. When such an object is dropped onto one of data controls 2, the database access system of the present invention accesses the application program interface (API) for the database which converts the information content of the text to the format appropriate for the field of the database corresponding to the data control on which the data object was dropped, for example a date/time or numeric format. The database access system according to preferred embodiments of the present invention, communicates with the database API through a data access layer (explained below). When information content is moved or copied as text it becomes manipulable within the application or database using the functionality of the application or database.

Alternatively, data objects may be moved or copied as OLE embedded objects. Text, date/time and numeric data formats are all simple data formats. Some databases and applications, however, also support data formats in which the information content can be anything, i.e., complex data formats. For instance, in Lotus Notes®, such complex data formats are called composite fields, or Notes rich text. For databases and applications which support such complex data formats, data may be moved or copied as an OLE embedded object. When objects are move/copied as OLE embedded objects no conversion of data format is necessary because the data object remains in the data format of the server application (the format of the database or application in which the data object was created). Move/copying a data object as an OLE embedded object allows a user to update the information content of the object in one location, for instance, the database, and have the update take effect in the application simply by double clicking on the OLE embedded object. Double clicking on an OLE embedded object launches the application in which the object was created. The information content of the OLE embedded object is updated according to any changes which may have occurred in the application in which the OLE embedded object was created.

Figure 8A:
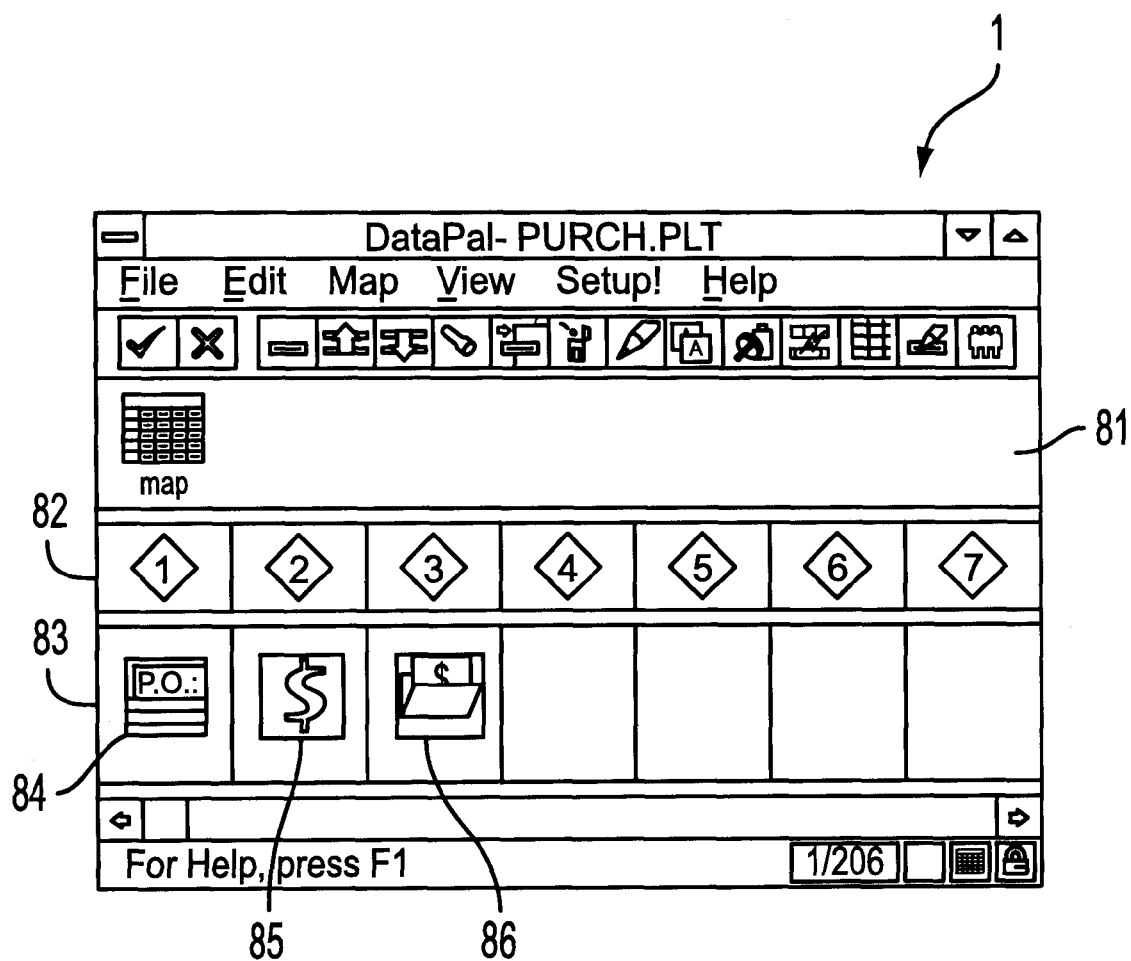
FIG. 8a shows one example of the data palette of FIG. 2 with a mapping function active according to one embodiment of the present invention.
Figure 8B:
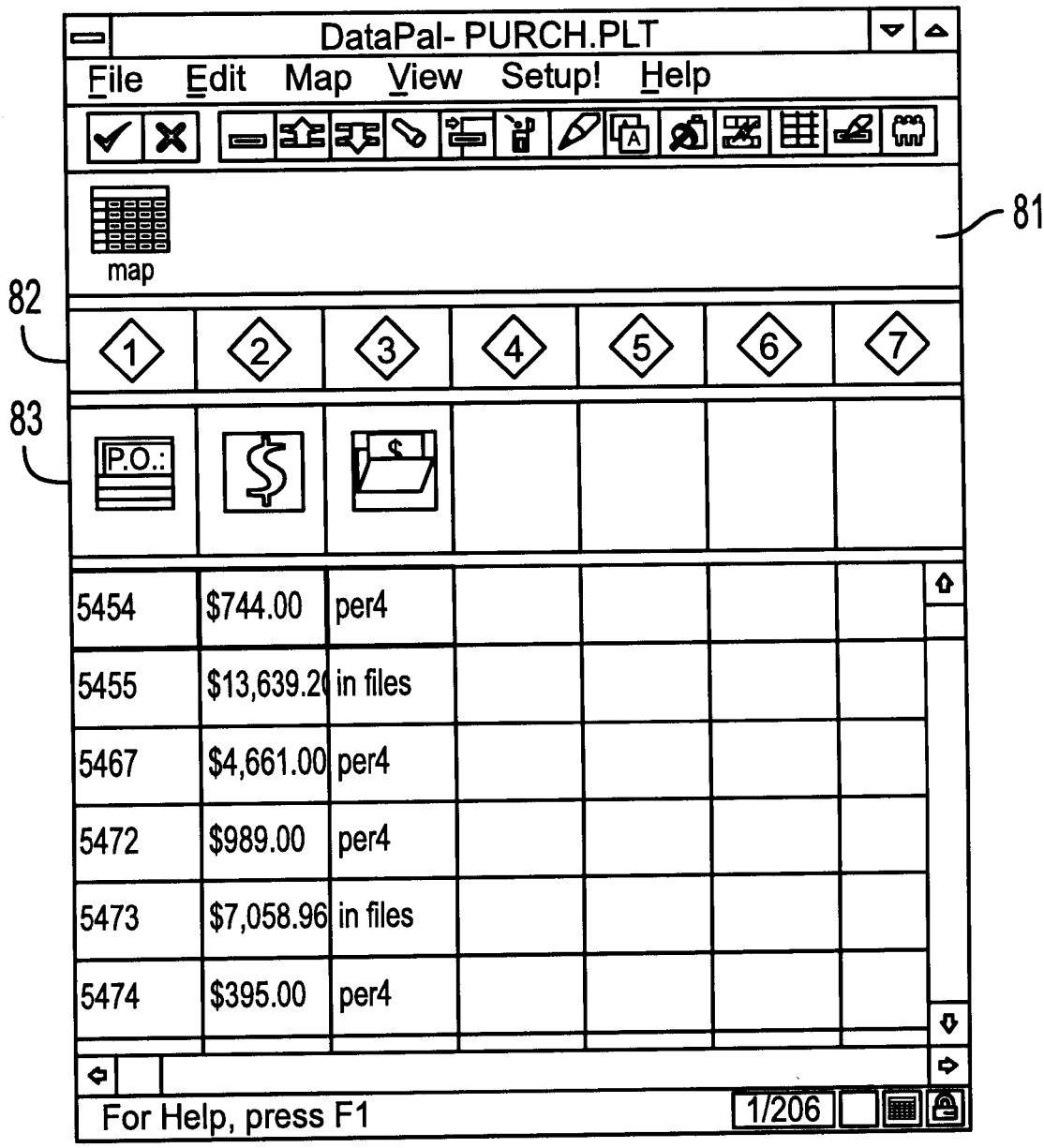
FIG. 8b shows one example of the data palette of FIG. 2 with a mapping function and a data grid active according to one embodiment of the present invention.

Accessing the contents of a database is not limited to a single field at a time. As mentioned above, data palette 1 includes mapping functionality which allows multiple fields to be move/copied at one time either to or from a database. The mapping function is selected by actuating a map button from menu bar 4 (FIG. 2). FIG. 8a shows data palette 1 with the mapping function activated. Data palette 1 with the mapping function active comprises a map pane 81, map definition pane 82 and data control pane 83. Map pane 81 presents a list of the available maps for the data palette and which of those maps is active. In the embodiment shown in FIG. 8a there is only a single map available for the data palette. Map definition pane 82 allows a numerical order to be assigned to the data controls of a palette by manipulating the sliders (the numbered diamonds) within map definition pane 82. That is, the sliders can be rearranged by dragging and dropping. For instance, in FIG. 8a, data control 84 is ordered first, data control 85 is ordered second and data control 86 is ordered third. The map shown in FIG. 8a allows three separate data items from an application to be selected at one time to form a single data object which may be move/copied to the database. For example, for the database shown in FIG. 8a, a purchase order number (corresponding to data control 84), a purchase order amount (corresponding to data control 85) and purchase order file information (corresponding to data control 86) may be selected in an application as a single data object, for instance, by selecting a row of a spreadsheet or by selecting each item separately as a single data object. The functionality of the application in which the items are selected controls how the separate items are selected as a single item. In some applications this may be accomplished by, for example, holding down the control key as the separate items are selected. This data object may then be dragged and dropped onto data palette 1. Data palette 1 will automatically sort the three separate data items contained in the data object into the fields of the database in the order in which they are selected. That is, first object selected into the field associated with data control 84, second object selected into the field associated with data control 85 and the third item selected into the field associated with data control 86. If the data object originated by selecting a row of a spreadsheet with three columns, then the column entries of the spreadsheet would be separated by recognizing tabbed elementation (as explained above) and sorted into the fields of the database from left to right. That is, the leftmost column entry would be placed in the first ordered data control and the rightmost column entry would be placed in the third ordered data control. Further, maps are bi-directional so that information content from multiple fields of a database can be move/copied to an application in; single operation. That is, a map may be dragged from a data palette and dropped onto an application. Dropping a map onto an application will result in all information content that is selected in the data palette (typically the information content in the database corresponding to the active row of a result set) being move/copied into the application in the field order specified by the map. This would be useful, for instance, to transfer the contents of a database into columns of a spreadsheet in an order different from how they arranged in the database. FIG. 8b shows data palette 1 with the mapping function and the data grid active.

Figure 9:
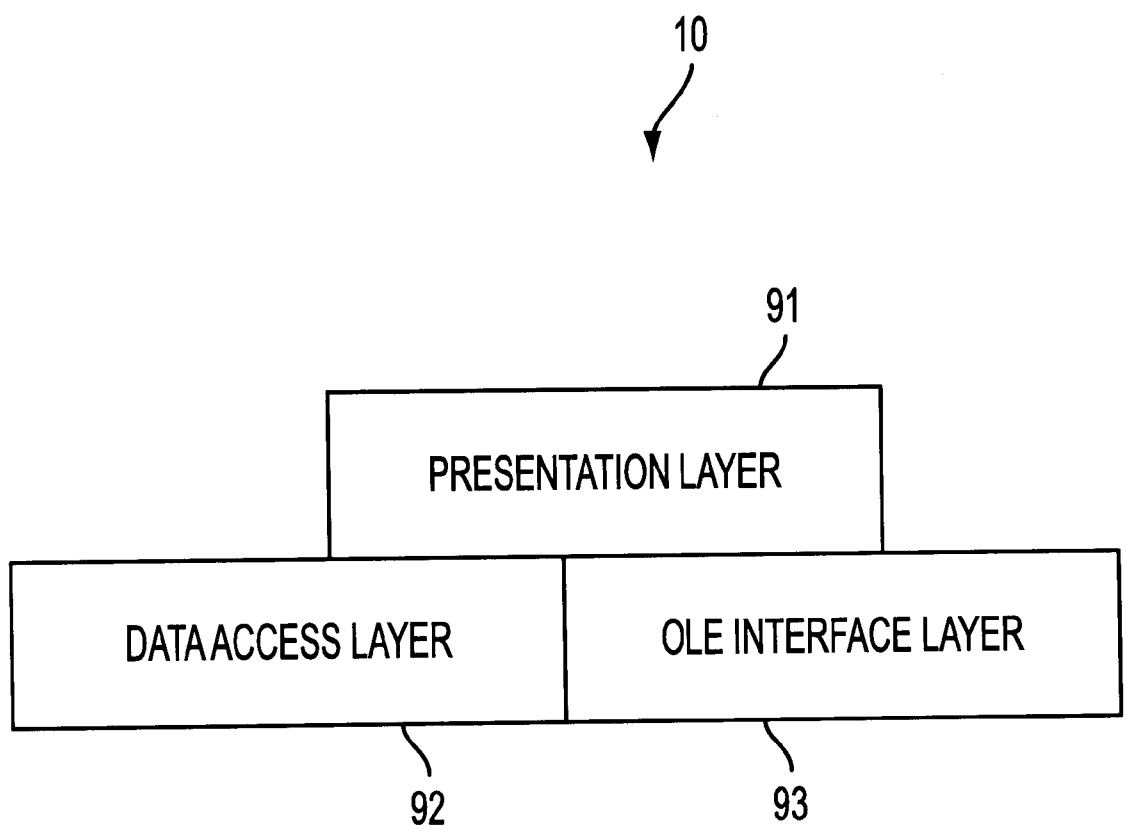
FIG. 9 is a high level representation of a database access system according to on embodiment of the present invention.

One embodiment of the database access system according to the present invention is explained in conjunction with FIGS. 9–12 and using data palette 1 as the information interface. Like reference numerals are used when possible. FIG. 9 shows one embodiment of a database access system 10 according to the present invention. System 10 contains three layers: presentation layer 91; data access layer 92; and, OLE interface layer 93. Presentation layer 91 provides communication between system 10 and a user. One embodiment of presentation layer 91 operating in the Lotus Notes® system is shown in FIG. 10a. Presentation layer 91 comprises system icon 101, setup dialogue 40 and data palette 1. These three components comprise the primary user interfaces for system 10. The function of data palette 1 and setup dialogue 40 have been explained above. System icon 101 launches system 10 from a user application and implements a system menu allowing, among other things, a particular palette or palettes to be automatically activated, a user to retrieve a palette whose parameters have already been established through setup dialogue 40 or to implement setup dialogue 40.

Figure 10A:
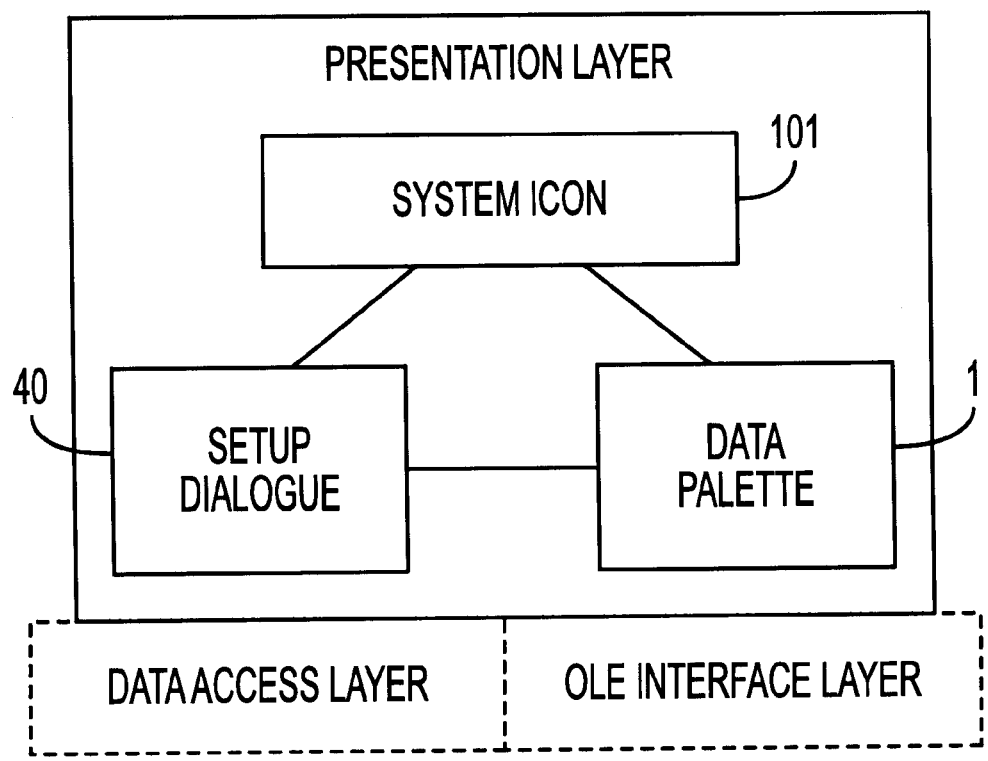
FIG. 10a is a high level representation of a database access system of FIG. 9 showing details of the presentation layer according to one embodiment of the present invention
Figure 10B:
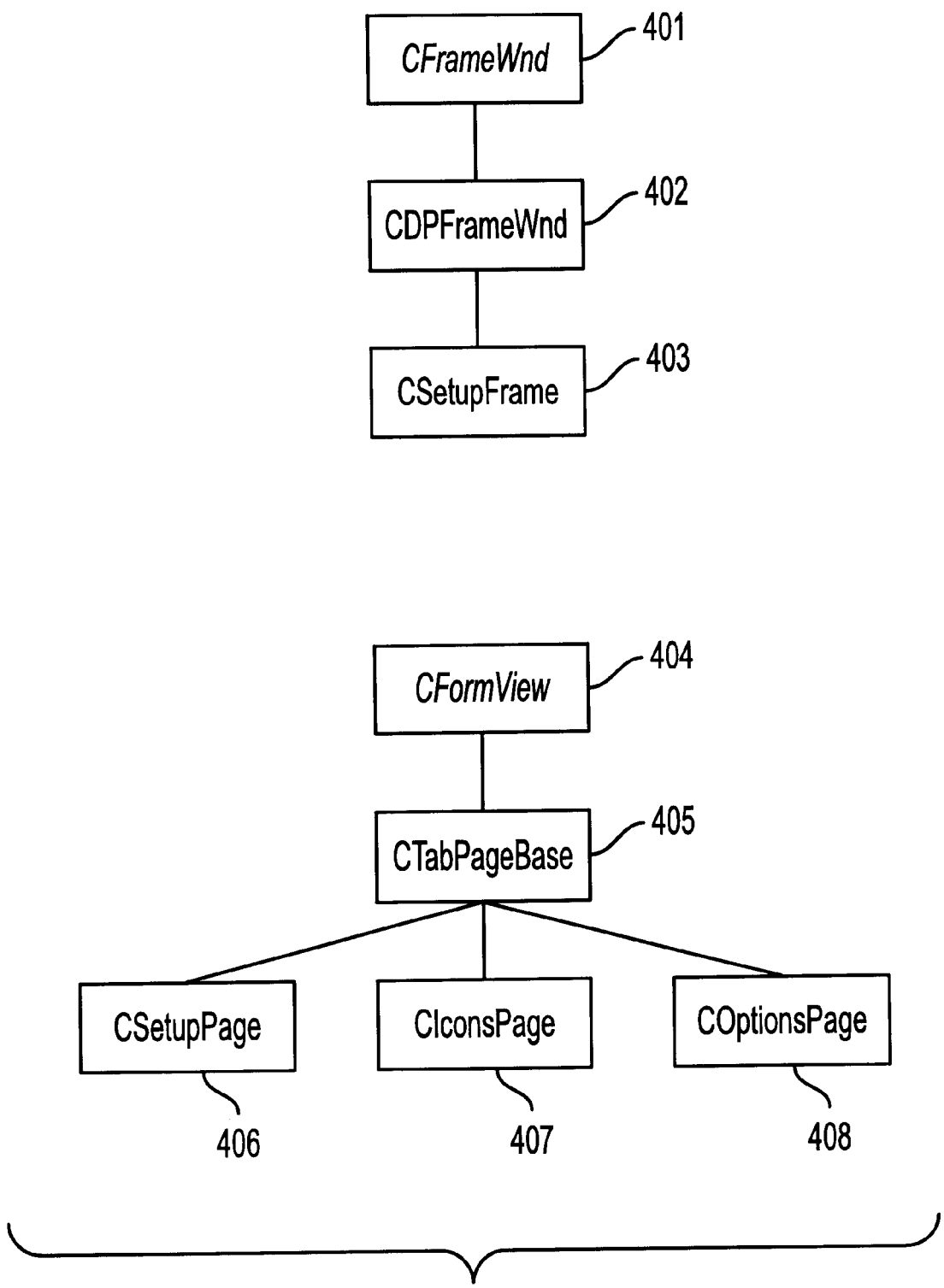
FIG. 10b depicts an example of the taxonomy of a path dialogue according to one embodiment of the present invention.

FIG. 10b shows the taxonomy for one embodiment of setup dialogue 40. Throughout this application, classes defined for system 10 are indicated in regular type while Microsoft® Foundation Class (MFC) classes and OLE classes are indicated in italics. Setup dialogue 40 comprises objects of the following classes, *CFrameWnd* 401, CDPFrameWnd 402, CSetupFrame 403, *CFormview* 404, CTabPageBase 405, CSetupPage 406, CIconsPage 407 and COptionsPage 408. Generally, CSetupPage 406, CIconsPage 407 and COptionsPage 408 implement the data source, icons and options menus within a frame provided by CDPFrameWnd 402 and CSetupFrame 403 which inherit from the MFC class *CFrameWnd* 401 which implements a window frame. The separate menu options from the data source, icons and options menu are predefined in the resources of system 1.

Figure 10C:
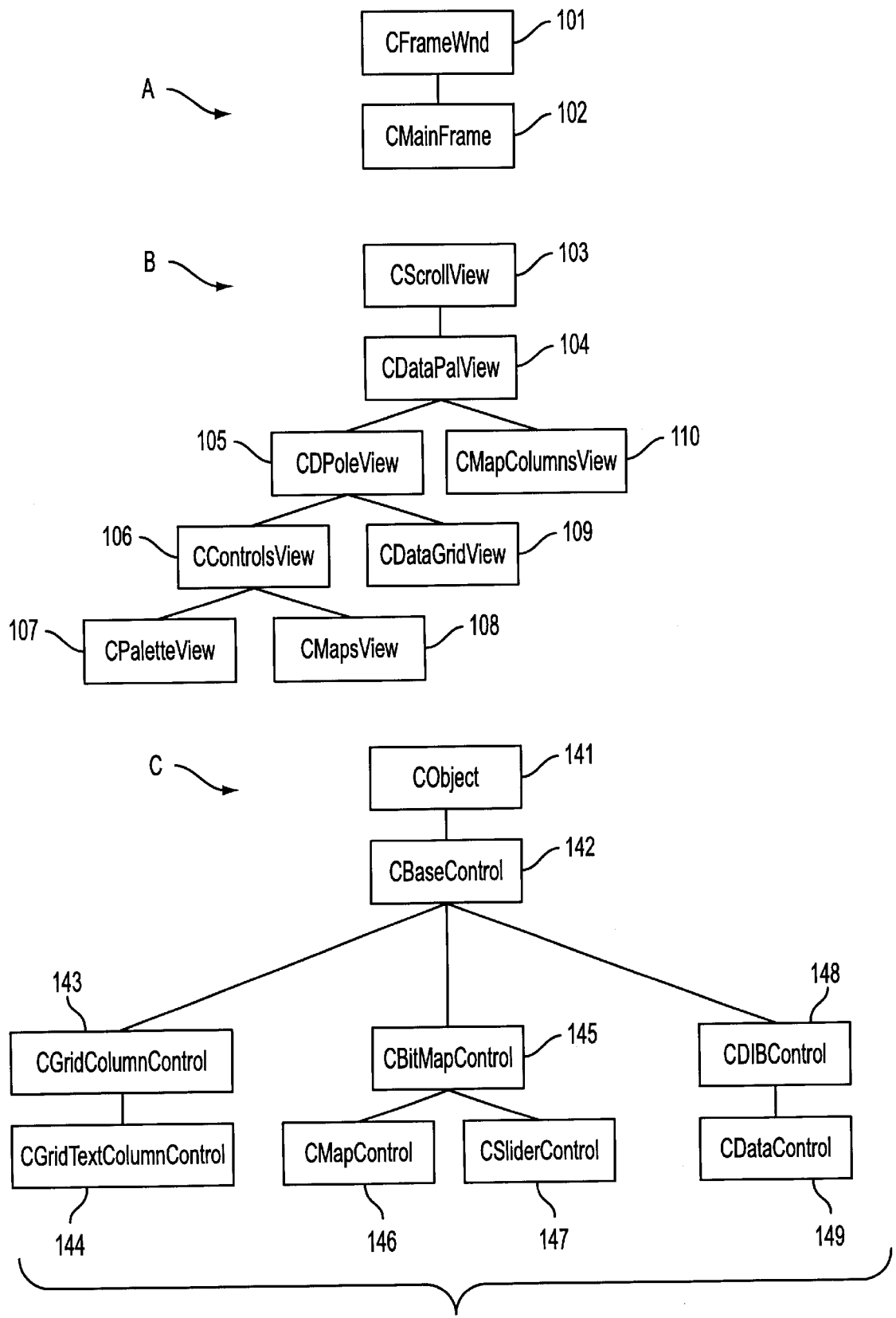
FIG. 10c depicts an example of the taxonomy of a data palette according to one embodiment of the present invention.

FIG. 10c shows the taxonomy for data palette 1. The taxonomy for data palette 1 comprises frame structure A, view structure B and control structure C. Frame structure A provides a frame for data palette 1 and comprises instances of objects from the following classes: *CFrameWnd* 101 and CMainFrame 102. View structure B controls the appearance of data palette 1 and comprises instances of objects from the following classes: *CScrollView* 103, CDataPalView 104, CDPOleView 105, CControlsView 106, CPaletteView 107, CMapsview 108, CDataGridView 109 and CMapColumnsView 110. View classes, in general control the way in which data is presented. CDataPalView 104 is the base class for all of the views of a system according to the present invention. CDPOleView 105 is the parent view class that manages OLE functionality for its subclasses. CControlsView 106 is the parent view class for views that contain bitmap-based data controls. CPaletteView 107 is the implementation view class for the data palette. CMapsview 108 is the implementation view class for maps. CDataGridView 109 is the implementation view class for the data grid. CMapColumnsView 110 is the implementation Control structure C determines the functionality of data palette 1 and comprises instances of objects from the following classes: *CObject* 141, CBaseControl 142, CGridColumnControl 143, CGridTextColumnControl 144, CBitMapControl 145, CMapControl 146, CsliderControl 147, CDIBControl 148 and CDataControl 149. *CObject* 141 is a root class for the entire MFC application framework. *CObject* 141 provides a unique identifier for every created object allowing an object to maintain information about itself at runtime and allocating a base amount of memory to an object when it is created. CBaseControl 142 is the base class for all of the data palette controls. CGridColumnControl 143 is the parent class for controls that appear in the data grid. CGridTextColumnControl 144 is the implementation class for data grid controls that contain text representations of result set data. CBitMap-Control 145 is the base class for data controls that display bitmap representations (the slider controls used to make a map are one example of controls that display bitmap representations). CMapControl 146 is the implementation class for the map control used to indicate that a map exists. CSliderControl 147 is the implementation class for the sliders used to define the ordering of elements within a map. CDIBControl 148 is the base class for the data controls that display device independent bitmap (DIB) representations. CDataControl 149 is the implementation class for the data controls of a data palette. CDataControl 149 displays a bitmap of known dimension corresponding to the data controls and controls the interaction of other objects to accomplish the move/copy of information content. Structures A, B and C shown in FIG. 10c represent the entire data palette populated with data controls.

Figure 11A:
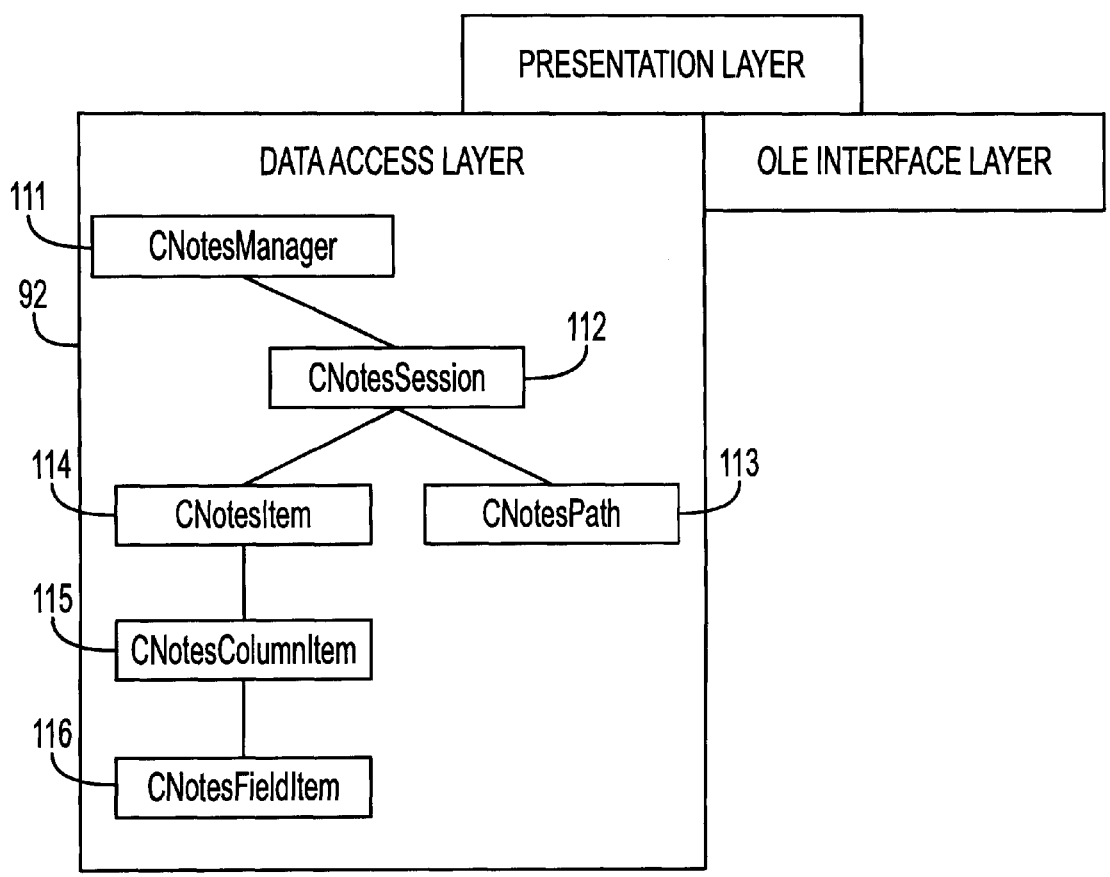
FIG. 11a is a high level representation of a database access system of FIG. 9 showing details of the data access layer according to one embodiment of the present invention.

Data access layer 92 provides communication between system 10 and the database being accessed. For instance, as mentioned above in conjunction with move/copying information content from an application to a database (FIG. 7, step 703), system 10 uses an API of a database being accessed to provide data format conversion between a user application and a database when necessary. System 10 also uses the API of the database being accessed for, among other things, determining what servers and databases are available. Data access layer 92 enables system 10 to move/copy the information content and to instruct the database API to do the data format conversion. In one embodiment system 10 operates in the Windows® platform and in the Lotus Notes® environment, that is with databases created in Lotus Notes®. FIG. 11a shows data access layer 92 as an interface to the HiTest API (hereinafter HiTest). In this embodiment, data access layer 92 comprises the following components: CNotesManager 111, CNotesSession 112, CNotesPath 113, CNotesItem 114, CNotesColumnItem 115 and CNotesFieldItem 116. According to one embodiment, these components are all C++ objects functioning to control communication between system 10 and HiTest.

Figure 11B:
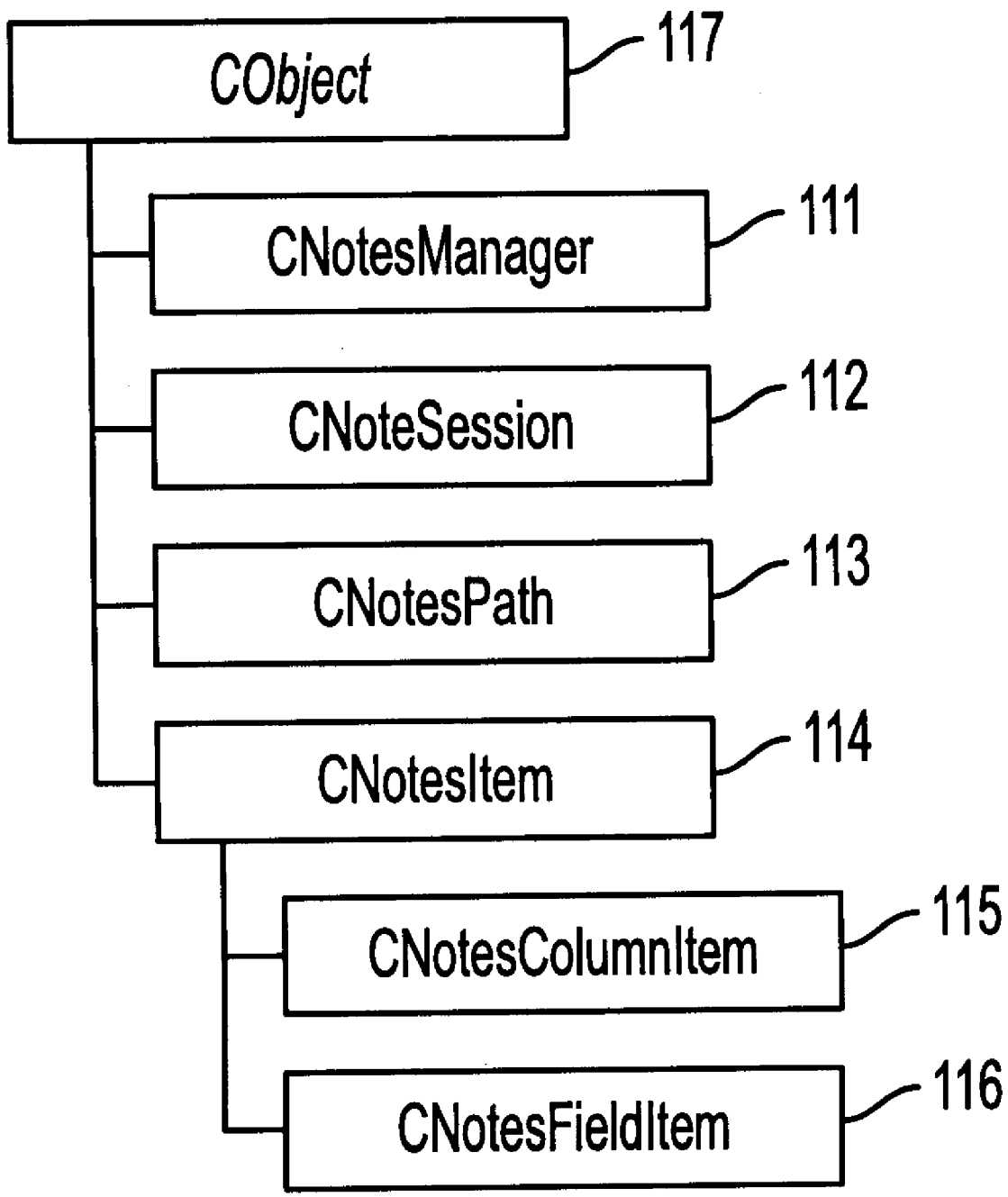
FIG. 11b depicts an example of the taxonomy of the data access layer shown in FIG. 11a according to one embodiment of the present invention.

FIG. 11b shows the taxonomy for the embodiment of data access layer 92 shown in FIG. 11a. As can be seen from FIG. 11b, the members of the CNotesManager family inherit from *CObject* 117. CNotesManager 111 opens, closes and initializes database API access. CNotesSession 112 manages interactions with a Notes database such as database manipulations and result set generation and navigation. CNotesPath 113 is a class that contains a storage location used by CNotesSession 112 to store the location of a server, a database and forms and views of the database. CNotesItem 114 is the base class for all representations of Notes data elements. CNotesColumnItem 115 and CNotesFieldItem 116 are implementation classes for representations of data elements from views and forms respectively. That is, for Lotus Notes® databases the data within any view is in a column and the data within any form is in a field. CNotesColumnItem 115 and CNotesFieldItem 116 are used as repositories for data which is being move/copied.

The components shown in FIGS. 11a and 11b are collectively referred to as the CNotesManager family. The CNotesManager family services all of the calls to HiTest. System 10 contains a single instance of CNotesManager 111 which initiates N instances of CNotesSession 112, where N is constrained by the available resources of Windows® and available memory (FIG. 11a shows the situation where N=1). Each instance of CNotesSession 112 is associated with its own data palette 1 and comprises a unique cursor obtained through HiTest. CNotesManager 111 maintains a dictionary of associations between existing instances of CNotesSession 112 and data palette 1. In one embodiment, the dictionary is implemented by an instance of the MFC *CMapPtrToPtr*, a list class (not shown). This arrangement allows multiple data palettes 1 to be open at one time, with each data palette 1 manipulating its own result set of rows using a cursor obtained through HiTest. Each data palette 1 may operate in the same or different databases and/or servers.

According to HiTest protocol, system 10, and more specifically data palette 1, accesses HiTest functions by making a request through CNotesManager 111. CNotesManager 111 either services requests to HiTest itself, or forwards the request to another member of the CNotesManager family depending on the type of functions being requested from HiTest CNotesManager 111 services calls to HiTest relating to establishing and terminating HiTest connections, setting global options and establishing a client error callback routine. CNotesItem 114 (and the CNotesColumnItem 115 and CNotesFieldItem 116 subclasses) services calls to HiTest involving establishing program variables which are recognized by HiTest. CNotesSession 112 retains most of the responsibility for HiTest interaction. CNotesSession 112 services calls to HiTest involving, for instance, opening and closing cursors, setting default forms and views and managing row handling (for instance navigating a result set or creating new rows within a database). Generally, calls to HiTest not handled by CNotesManager 111 and CNotesItem 114 are the responsibility of CNotesSession 112. System 10 obtains HiTest functions dynamically in local method scope (that is, from Windows® running on the computer on which system 1 resides). The functions obtained from the HiTest API are not retained in the class structure of system 1.

Although data access layer 92 has been explained in conjunction with a specific embodiment of accessing a database in the Lotus Notes® environment, system 10 is not limited thereto. The structure of data access layer 92 used in other database environments would be similar to that shown in FIGS. 11*a* and 11*b* and is derivable by one of ordinary skill in the art. Further, the preferred embodiments of the present invention are not limited to accessing databases in a single environment. Rather a more general taxonomy could be retrofit in order to accommodate for instance, relational databases as well as Lotus Notes® databases by defining new abstractions and having the CNotesManager-related classes inherit from the new parent. Such a more general taxonomy is also derivable by one of ordinary skill in the art.

Figure 12A:
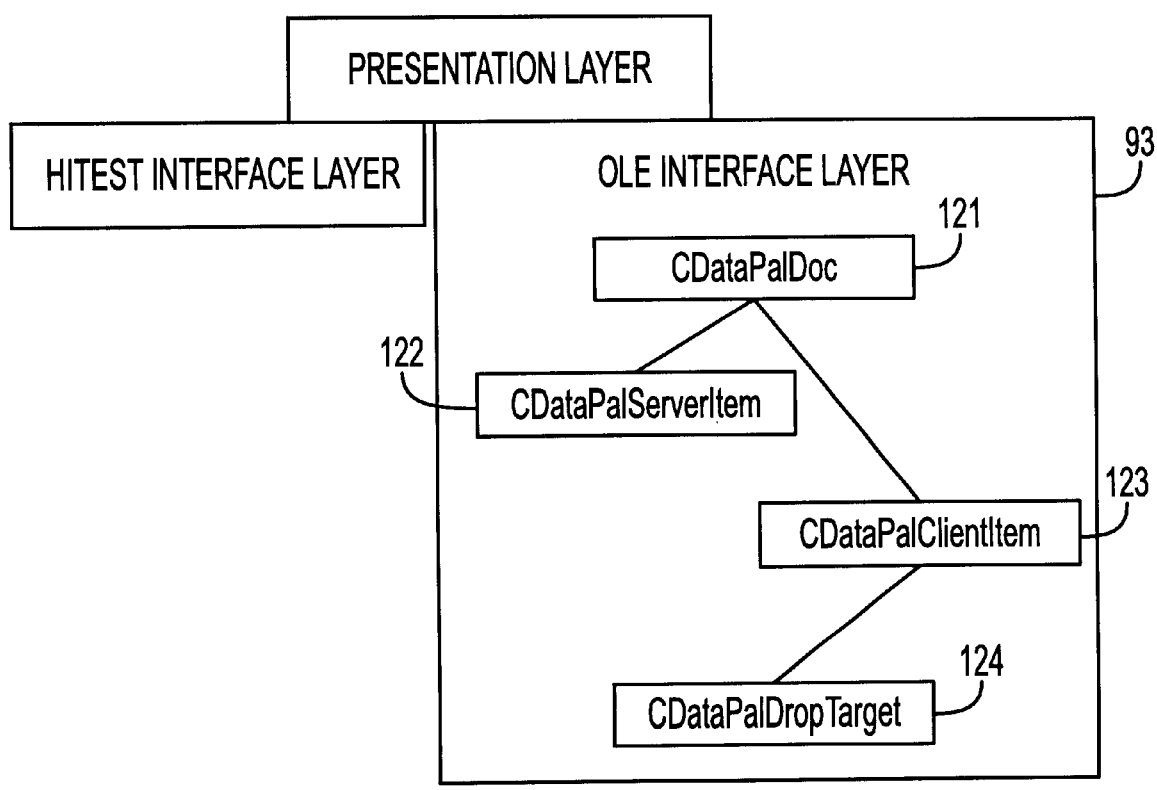
FIG. 12a is a high level representation of a database access system of FIG. 9 showing details of an OLE Interface layer according to one embodiment of the invention.
Figure 12B:
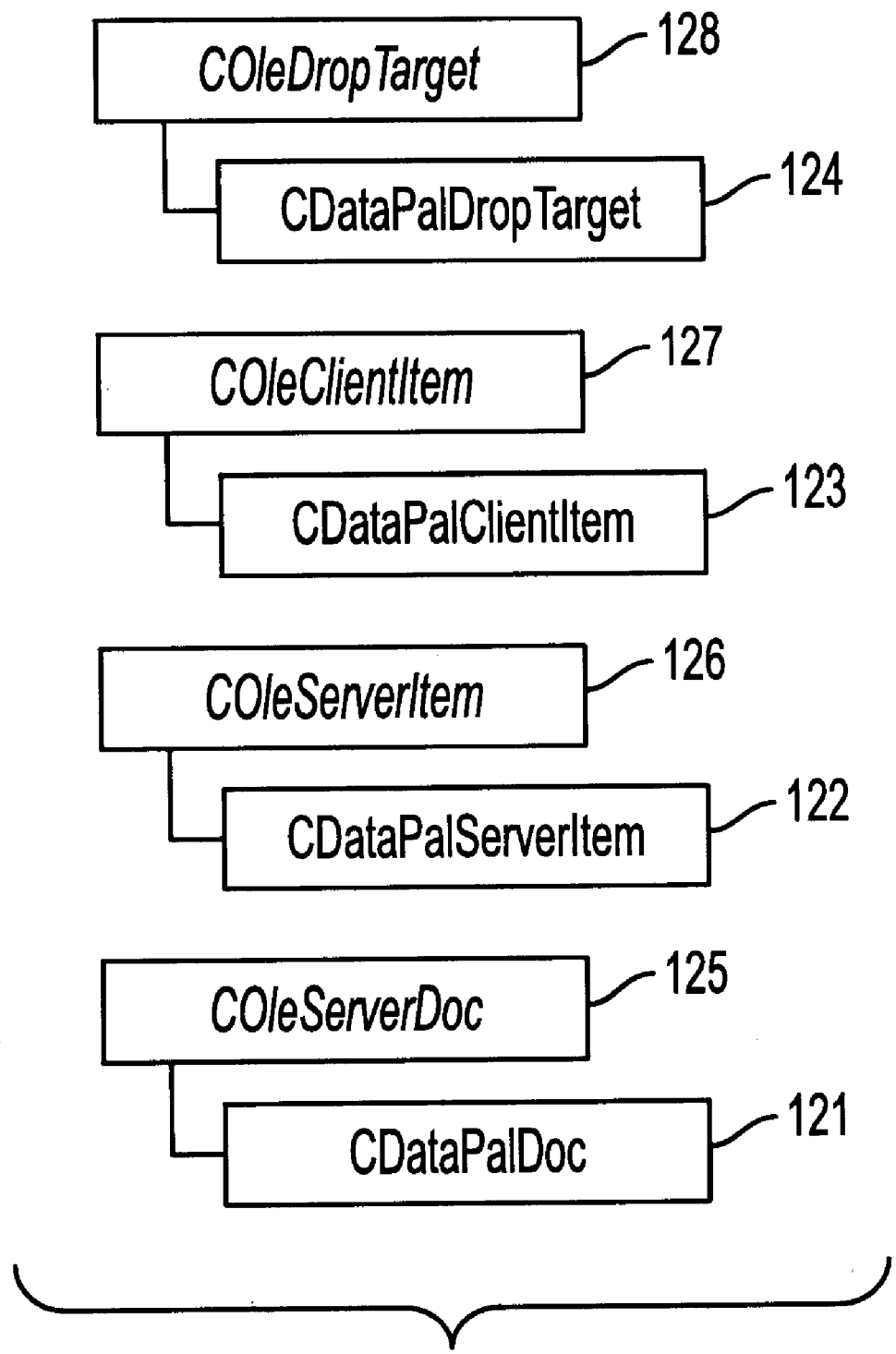
FIG. 12b depicts an example of the taxonomy of the OLE Interface layer of FIG. 12a according to one embodiment of the present invention.

System 10 uses OLE as the information exchange medium between a desired database and OLE enabled user applications. As explained above in conjunction with the FIG. 7, step 703, system 10 allows a move/copy to take place either as text or as an OLE embedded object. And, in either case, OLE is used to create the data object. OLE interface layer 93 enables system 10 to communicate with OLE to accomplish the information exchange. One embodiment of OLE interface layer 93 is shown in FIGS. 12*a* and 12*b* with system 10 operating on a Windows® platform in the Lotus Notes® environment using data palette 1 as the information interface. OLE interface layer 93 comprises the following components: CDataPalDoc 121, CDataPalSrvrItem 122, CDataPalClientItem 123, and CDataPalDropTarget 124. These components are all C++ objects functioning to provide the communication between system 10 and OLE.

FIG. 12*b* shows the taxonomy of the embodiment of OLE interface layer 93 shown in FIG. 12*a*. The taxonomy shows that components 121–124 are subclasses of OLE framework classes. CDataPalDoc 121 inherits from *COleServerDoc* 125 and defines data palette 1. CDataPalDoc 121 is a representation of what is stored in palette 1, for instance, existing data controls and maps. CDataPalServerItem 122 inherits from *COleServerItem* 126 and functions to package data which is selected so that it can be dragged and dropped. CDataPalClientItem 123 inherits from OLE framework class *COleClientItem* 127. CDataPalClientItem 123 is the data transfer object of system 10. That is, CDataPalClientItem 123 receives data extracted from an OLE object. CDataPalDropTarget 124 inherits from *COleDropTarget* 128 and provides user feedback during a drag and drop operation. For instance, if a drop is attempted to an unauthorized area, CDataPalDropTarget 124 provides an icon, for instance, a circle with a line through it to indicate a drop cannot occur to the cursor location.

The data controls function in conjunction with OLE to provide system 10 with its move/copy capability. An instance of CDataPalDropTarget 124 exists as the OLE drop target focus for each data palette. When a data object is dropped on a data control, CDataControl 149 refers the drop to the corresponding instance of CDataPalDropTarget 124 which accesses OLE functionality through *COleDropTarget* 128. CDataControl 149 ascertains the affected data control by hit testing the mouse position in relation to itself. That is, because CDataControl 149 knows the palette position on the screen, the size and number of data controls within the palette, and the position of the mouse it can determine over which data control a drop occurred. CDataPalDropTarget 124 is a member of the parent view class CDPOleView 105. CDPOleView 105 delegates handling OLE related functions to its derived child classes (for example, CPaletteView 107) which in turn invoke *COleDropTarget* 128 and the well known MFC command handlers, for instance, *OnDragEnter, OnDragOver, OnDragLeave* and *OnDrop*.

When information content is move/copied either from a data control to an application or from an application to a data control, the above described objects interact to accomplish the move/copy. For example, if information content is being copied from a database into an application, when the desired data control is highlighted to create a data object, the information content in the field corresponding to the data control is stored in an instance of CNotesItem 114. When the data object is dragged off the palette, instances of *COleServerItem* 126 and *COleServerDoc* 125 are created to store the information content and information about the representation of the information content respectively. Finally, when the highlighted data control is dropped in the destination application, the OLE functionality of the application creates an instance of *COleClientItem* to accept the information content. For transfers from an application to a database, the interaction between the objects is reversed. That is, the system of the present invention initiates an instance of *COleClientItem* 127 to accept the information content packaged up using the applications OLE functionality.

Figure 13A:
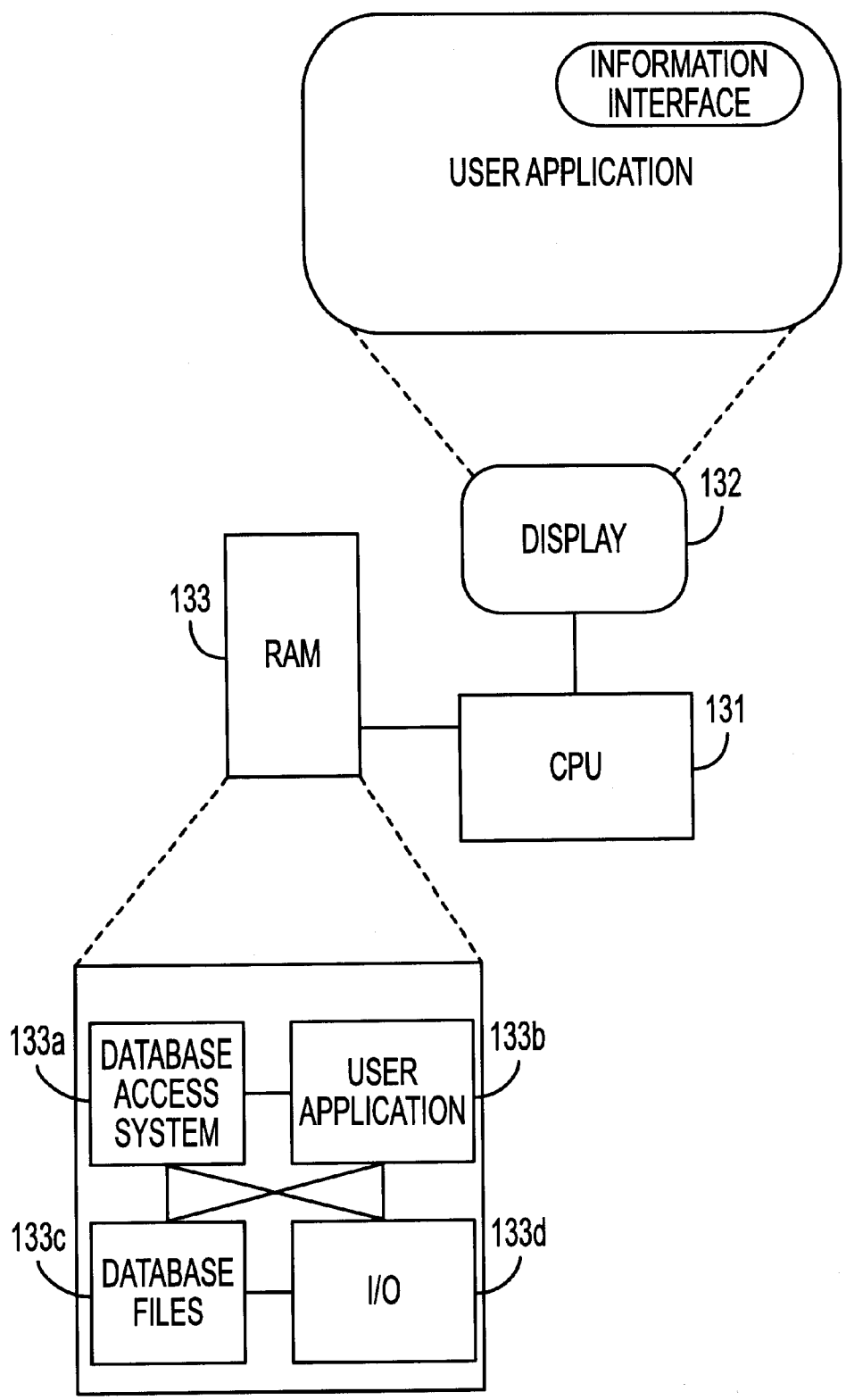
FIG. 13a is a schematic view of one example of a computer configured to operate a database access system according to one embodiment of the present invention.
Figure 13B:
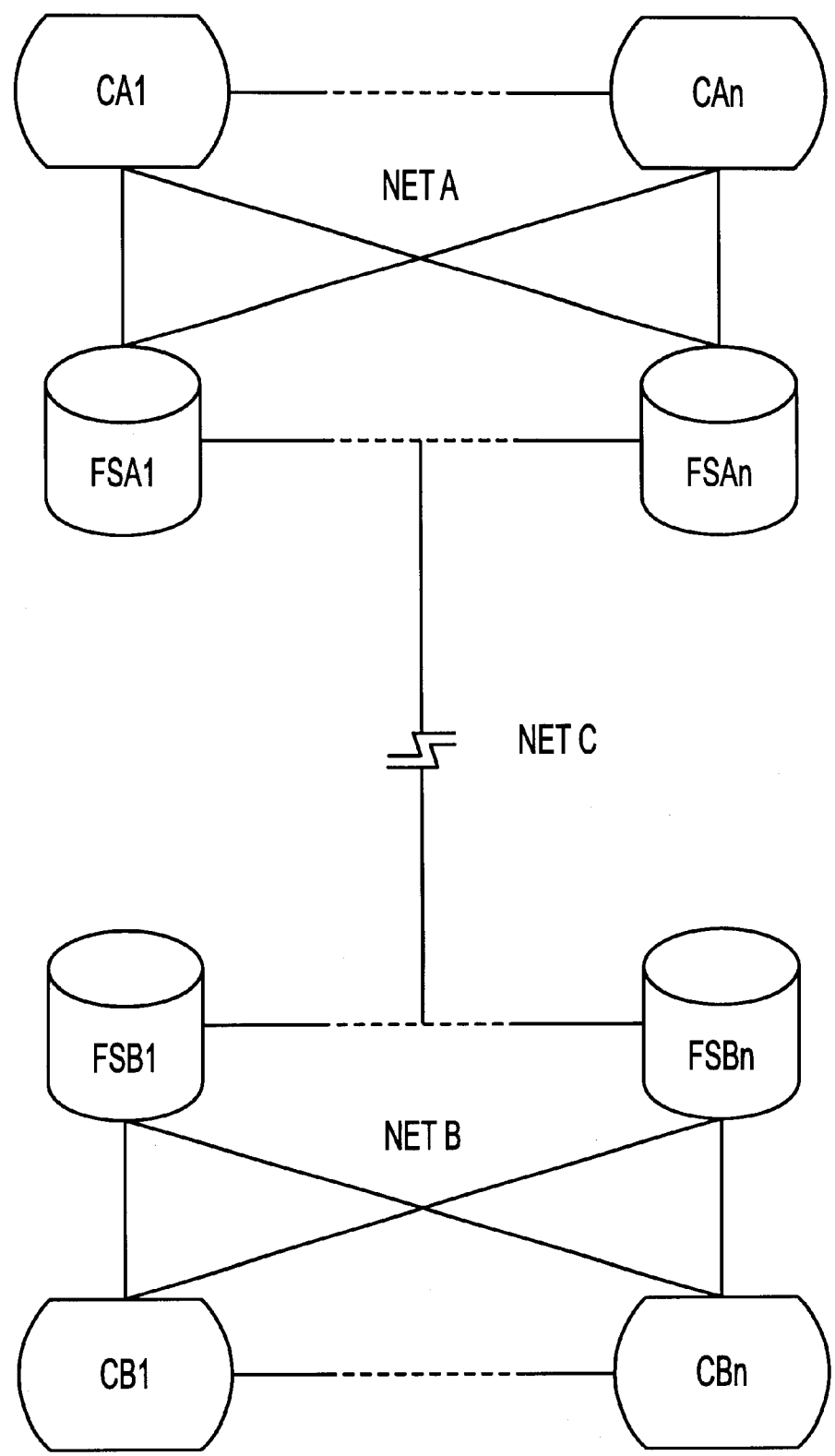
FIG. 13b is a schematic view of one example of a computer system within which the computer of FIG. 13a might operate according to one embodiment of the present invention.

In one embodiment a system according to the preferred embodiments of the present invention operates on a stand alone computer or on a computer system as is shown in FIGS. 13*a* and 13*b*. FIG. 13*a* schematically depicts a computer comprising a CPU 131, a display 132 and RAM 133. The computer is configured to utilize a database access system according to the embodiments of the present invention. As shown in FIG. 13*a*, local RAM 133 of the computer includes at least database access system 133*a*, an OLE enabled user application 133*b* running on the computer and database files 133*c*. The system according to the preferred embodiments of the present invention enables data to be exchanged between a database within local RAM 133 and a user application running on the computer through the information interface displayed on the display screen of the computer. The local RAM 133 may also include I/O 133d. By using I/O 133d the data exchange system may communicate with a network and thereby access databases residing on fileservers within the network. FIG. 13b shows an example of a network within which the computer of FIG. 13a may operate. FIG. 13b shows networks, NETA and NETB in communication via a network, NETC. To simplify the drawings, FIG. 13b shows only three networks. Nevertheless the computer system of FIG. 13b is limited only by available resources. Each network comprises n computers, and n fileservers in communication and connected in a LAN or WAN. The number of computers and fileservers is also limited only by the resources of the computer system. The data exchange system of the present invention enables data to be move/copied between, for instance, an application running on CA1 and a database residing or FSB2.

A database access system has been described, and specific embodiments thereof have been presented with reference to a Windows® environment. Nevertheless, the embodiment presented are exemplary, and the invention is not limited to the embodiments presented or to operation in the Windows® environment. For example, other types of information interfaces, for instance, a tabbed dialogue, could be established using procedures similar to those explained above and could be given analogous functionality to the data palette. Further, the method and system according to preferred embodiments of the present invention are not limited to operation within computers and computer systems as discussed in conjunction with FIGS. 13. Other variations of the present invention are possible within the scope of the invention defined by the following claims.

What is claimed is:

1. A system for searching and accessing a plurality of unopened applications and databases comprising:
   a plurality of unopened OLE enabled user applications running on a computer, said plurality of unopened OLE enabled user applications having one or more unopened databases; and,
   a GUI displayed on a display of said computer, said GUI comprising an intelligent palette that searches and accesses said plurality of unopened OLE enabled user applications and said one or more unopened databases, said GUI enabling information content of said plurality of unopened OLE enabled user applications and said one or more unopened databases to be searched and accessed from said plurality of unopened OLE enabled user applications;
   whereby said intelligent palette searches and accesses appropriate ones of said plurality of unopened OLE enabled user applications and said one or more unopened databases based on user input received by said intelligent palette.

2. The system of claim 1 wherein the computer operates within a network, said network comprising a plurality of fileservers, said fileservers comprising a plurality of databases; wherein said one or more unopened databases may reside on any of the plurality of fileservers.

3. The system of claim 1 wherein the computer is a stand alone PC and further wherein said one or more unopened databases reside on local RAM of the PC.

4. The system of claim 1 wherein the GUI comprises means for displaying said information content of said one or more unopened databases on the display of the computer.

5. The system of claim 1 wherein the GUI further comprises means for controlling displaying information content of said one or more unopened databases on the display of the computer.

6. The system of claim 1 wherein the GUI comprises means operative to search for specific information content in said one or more unopened databases.

7. The system of claim 1 wherein said intelligent palette comprises data controls and a tool bar, each data control corresponding to a user-selectable field in said one or more unopened databases.

8. In a computer comprising a CPU, RAM, and a display, a method of searching and accessing information content from a plurality of unopened applications and databases comprising:
   displaying a GUI on the display, said GUI comprising an intelligent palette that searches and accesses a plurality of unopened applications and unopened databases, said intelligent palette operable to search and access information content in said unopened databases from said plurality of unopened applications operating on said computer;
   receiving user input via said intelligent palette;
   searching said information content of said plurality of unopened applications and unopened databases;
   accessing information content of appropriate ones of said plurality of unopened applications and unopened databases using said intelligent palette based on said user input received by said intelligent palette.

9. The method of claim 8 wherein the GUI is operative to display the information content of a row in said unopened databases on the display of the computer.

10. The method of claim 9 wherein the GUI is further operative to control the displaying of the information content of the row in said unopened databases on the display of the computer.

11. The method of claim 8 further comprising the step of searching for specific information content in a field in said unopened databases using the GUI.

12. The method of claim 8 wherein said intelligent palette comprises data controls and a tool bar, each data control corresponding to a user-selectable field in said unopened databases.

13. A method for searching and accessing information content of a plurality of unopened applications and databases comprising:
   establishing a graphical user interface upon a portion of a display of a computer, said graphical user interface comprising an intelligent palette that searches and accesses a plurality of unopened applications and unopened databases, said graphical user interface comprising a set of visual cues representing user-selectable fields within said unopened databases;
   receiving user input via said intelligent palette;
   searching the information content of said plurality of unopened applications and unopened databases through the visual cues; and
   accessing the information content of appropriate ones of said plurality of unopened applications and unopened databases using said intelligent palette based on said user input received via said intelligent palette through the visual clues.

14. The method of claim 13 wherein the step of accessing the information content of said unopened databases comprises move/copying information content from a user application into said unopened databases.

15. The method of claim 14 wherein the information content move/copied to said unopened databases is move/copied in a static data format.

16. The method of claim 15 wherein the information content move/copied is move/copied as text.

17. The method of claim 14 wherein the information content move/copied to said unopened databases is move/copied as an OLE embedded object.

18. The method of claim 13 wherein the step of accessing the information content of said unopened databases comprises move/copying information content from said unopened databases to a user application.

19. The method of claim 18 wherein the information content move/copied to the user application is move/copied in a static data format.

20. The method of claim 19 wherein the information content move/copied to the user application is move/copied as text.

21. The method of claim 18 wherein the information content move/copied to the user application is move/copied as an OLE embedded object.

22. The method of claim 13 further comprising the step of displaying the information content of the user-selectable fields within said unopened databases.

23. The method of claim 22 wherein the information content of the user-selectable fields within said unopened databases is displayed within windows at a location of at visual cue corresponding to each of the user-selectable fields.

24. The method of claim 22 wherein the information content of the user-selectable fields is displayed in tabular form.

25. The method of claim 13 wherein the step of searching the information content of said plurality of unopened applications and unopened databases comprises:

creating a data object by selecting a word within a user application running on a users desktop;

positioning the data object over one of the visual cues;

searching a user-selectable field within said unopened databases corresponding to the visual cue over which the data object was positioned for the presence of the selected word.

26. A computer usable medium having computer readable program code embodied therein for searching and accessing a plurality of unopened applications and databases, the computer readable program code comprising:

computer readable program code for running a plurality of unopened OLE enabled user applications on a computer, said plurality of unopened OLE enabled user applications having one or more unopened databases;

computer readable program code for displaying a GUI on a display of said computer, said GUI comprising an intelligent palette that searches and accesses said plurality of unopened OLE enabled user applications and said one or more unopened databases;

computer readable program code for receiving user input via said intelligent palette;

computer readable program code for enabling said intelligent palette to search information content of appropriate one of said plurality of OLE enabled user applications and said one or more unopened databases based on said user input; and computer readable program code for accessing said information content of said plurality of OLE enabled user applications and said one or more unopened databases.

27. The computer usable medium of claim 26 further comprising computer readable program code enabling said intelligent palette to search for specific information content in said one or more unopened databases.

28. The computer usable medium of claim 26 wherein said intelligent palette comprises data controls and a tool bar, each data control corresponding to a user-selectable field in said one or more unopened databases.

29. The computer usable medium of claim 26 further comprising computer readable program code for accessing said information content of said plurality of OLE enabled user applications and said one or more unopened databases using a set of visual cues representing user-selectable fields within said one or more unopened databases.

30. A method for searching and accessing information content of a plurality of unopened applications and databases comprising:

displaying a GUI on a display, said GUI comprising an intelligent palette that searches and accesses appropriate ones of a plurality of unopened user applications and unopened databases based on user input received via the intelligent palette, said GUI comprising at least one of a set of visual cues representing user-selectable fields within said database and an intelligent palette, said intelligent palette comprising data controls and a tool bar;

creating a data object by selecting data within at least one of said plurality of unopened user applications running on a user's desktop;

selecting a data object;

positioning said data object over at least one of said visual cues and said data controls;

dropping said data object onto said at least one of said visual cues and said data controls; and selecting a tool bar function, said tool bar function operative to at least one of access and manipulate information content of said plurality of unopened user applications and unopened databases.

31. A system for searching and accessing a plurality of unopened applications and databases comprising:

a display;

a plurality of unopened OLE enabled user applications operable on the display, the plurality of unopened OLE enabled user applications having one or more unopened databases;

a graphical user interface displayed on the display, the graphical user interface comprising an intelligent palette that searches and accesses the plurality of OLE enabled user applications and the one or more unopened databases, the graphical user interface comprising an intelligent palette with data controls that searches and accesses appropriate ones of the plurality of unopened OLE enabled user applications and the one or more unopened databases based on user input received via the intelligent palette, wherein the data controls enable a user to use content of the plurality of unopened OLE enabled user applications and the one or more unopened databases without the user having to open the plurality of unopened OLE enabled user applications and whereby the intelligent palette comprises a data grid as a portion of the intelligent palette and not separate form the intelligent palette.

32. A system for searching and accessing a plurality of unopened applications and databases comprising:

a plurality of unopened user applications and unopened databases;

at least one of the plurality of unopened user applications running on a computer, the computer in communication with at least one of the unopened databases; and a graphical user interface displayed on a display of the computer, the graphical user interface comprising an intelligent palette that searches and accesses the plurality of unopened user applications and unopened databases, the intelligent palette enabling information content of appropriate ones of the plurality of unopened user applications and unopened databases to be searched and accessed from the at least one of the plurality of unopened user applications based on user input received via the intelligent palette.

33. The system of claim 32, wherein the computer operates within a network, the network comprising a plurality of file servers, the file servers comprising a plurality of databases; wherein said unopened databases may reside on any of the plurality of file servers.

34. The system of claim 32, wherein the computer is a stand alone personal computer and further wherein said unopened databases reside on a local random access memory of the personal computer.

35. The system of claim 32, wherein the graphical user interface comprises means for displaying information content of said unopened databases on the display of the computer.

36. The system of claim 32, wherein the graphical user interface further comprises means for controlling displaying information content of said unopened databases on the display of the computer.

37. The system of claim 32, wherein the graphical user interface comprises means operative to search for specific information content in said unopened databases.

38. The system of claim 32, wherein said intelligent palette comprises data controls and a data toolbar, each data control corresponding to a user-selectable field in said unopened databases.

39. In a computer comprising a central processing unit, random access memory, and a display, a method of searching and accessing information content from a plurality of unopened applications and databases comprising:

displaying a graphical user interface on the display, said graphical user interface comprising an intelligent palette that searches and accesses a plurality of unopened applications and databases, the graphical user interface operable to search and access information content in said unopened databases of said plurality of unopened applications operating on the computer;

searching the information content of said plurality of unopened applications and said unopened databases based on user input received via said intelligent palette; and accessing the information content of appropriate ones of said unopened databases using the intelligent palette based on said user input received via said intelligent palette.

40. The method of claim 39, wherein the graphical user interface is operative to display the information content of a row in said unopened databases on the display of the computer.

41. The method of claim 40, wherein the graphical user interface is further operative to control the displaying of the information content of a row in said unopened databases on the display of the computer.

42. The method of claim 39, further comprising the step of searching for specific information content in a field of said unopened databases using the graphical user interface.

43. The method of claim 39, wherein the intelligent palette comprises data controls and a toolbar, each data control corresponding to a user-selectable field in said unopened databases.

* * * * *